US012537578B2

(12) United States Patent
Elshafie et al.

(10) Patent No.: US 12,537,578 B2
(45) Date of Patent: Jan. 27, 2026

(54) TECHNIQUES FOR COMMUNICATING PREDICTED CHANNEL STATE INFORMATION (CSI) REPORTS IN WIRELESS COMMUNICATIONS

(71) Applicant: QUALCOMM Incorporated, San Diego, CA (US)

(72) Inventors: Ahmed Elshafie, San Diego, CA (US); Diana Maamari, San Diego, CA (US); Mohamed Fouad Ahmed Marzban, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/317,577

(22) Filed: May 15, 2023

(65) Prior Publication Data

US 2024/0388341 A1 Nov. 21, 2024

(51) Int. Cl.
*H04B 7/06* (2006.01)
*H04L 5/00* (2006.01)
*H04W 72/12* (2023.01)

(52) U.S. Cl.
CPC ......... *H04B 7/0626* (2013.01); *H04L 5/0051* (2013.01); *H04L 5/0053* (2013.01); *H04W 72/12* (2013.01)

(58) Field of Classification Search
CPC ... H04B 7/0626; H04L 5/0051; H04L 5/0053; H04W 24/10; H04W 72/12
See application file for complete search history.

(56) References Cited

U.S. PATENT DOCUMENTS

| | | | |
|---|---|---|---|
| 2019/0207737 A1* | 7/2019 | Babaei | H04B 7/0632 |
| 2022/0386292 A1* | 12/2022 | Hajri | H04L 5/0057 |
| 2023/0097142 A1* | 3/2023 | Alfarhan | H04B 17/318 370/329 |
| 2023/0353326 A1* | 11/2023 | Jayasinghe Laddu | H04L 5/006 |
| 2024/0283512 A1* | 8/2024 | Zhang | H04L 1/06 |
| 2024/0334281 A1* | 10/2024 | Khoshkholgh Dashtaki | H04W 36/083 |
| 2024/0334462 A1* | 10/2024 | Chen | H04W 72/51 |
| 2025/0015861 A1* | 1/2025 | Wang | H04W 24/10 |
| 2025/0038816 A1* | 1/2025 | Beluri | H03M 7/70 |
| 2025/0055740 A1* | 2/2025 | Echigo | H04W 72/04 |
| 2025/0203428 A1* | 6/2025 | Fan | H04B 7/0691 |

* cited by examiner

*Primary Examiner* — Pao Sinkantarakorn
(74) *Attorney, Agent, or Firm* — Arent Fox Schiff LLP

(57) ABSTRACT

Aspects described herein relate to receiving control information related to scheduling multiple resources for wireless communications, including one of semi-persistent scheduling (SPS) for multiple downlink resources for receiving downlink communications or configured grant (CG) scheduling for multiple uplink resources for transmitting uplink communications, and transmitting, for a resource of the multiple resources, in an uplink resource, and based on receiving the control information, a predicted channel report indicating predicted channel measurements for the resource before receiving a downlink communication or transmitting an uplink communication over the resource. Other aspects relate to transmitting the control information and receiving the predicted channel report.

31 Claims, 10 Drawing Sheets

TECHNIQUES FOR COMMUNICATING PREDICTED CHANNEL STATE INFORMATION (CSI) REPORTS IN WIRELESS COMMUNICATIONS

FIELD OF THE DISCLOSURE

Aspects of the present disclosure relate generally to wireless communication systems, and more particularly, to techniques for communicating channel state information (CSI) reports.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect. 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to receive, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications, and transmit, for a resource of the multiple resources, in an uplink resource, and based on receiving the control information, a predicted channel report indicating predicted channel measurements for the resource before receiving a downlink communication or transmitting an uplink communication over the resource.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to transmit, for a user equipment (UE), control information related to scheduling multiple resources for wireless communications, including one of SPS for multiple downlink resources for transmitting, to the UE, downlink communications or CG scheduling for multiple uplink resources for receiving, from the UE, uplink communications, and receive, for a resource of the multiple resources, in an uplink resource, a predicted channel report indicating predicted channel measurements for the resource transmitting a downlink communication or receiving an uplink communication over the resource.

In another aspect, a method for wireless communication is provided that includes receiving, from a network node, control information related to scheduling multiple resources for wireless communications, including one of SPS for multiple downlink resources for receiving downlink communications or CG scheduling for multiple uplink resources for transmitting uplink communications, and transmitting, for a resource of the multiple resources, in an uplink resource, and based on receiving the control information, a predicted channel report indicating predicted channel measurements for the resource before receiving a downlink communication or transmitting an uplink communication over the resource.

In another aspect, a method for wireless communication is provided that includes transmitting, for a UE, control information related to scheduling multiple resources for wireless communications, including one of SPS for multiple downlink resources for transmitting, to the UE, downlink communications or CG scheduling for multiple uplink resources for receiving, from the UE, uplink communications, and receiving, for a resource of the multiple resources, in an uplink resource, a predicted channel report indicating predicted channel measurements for the resource transmitting a downlink communication or receiving an uplink communication over the resource.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
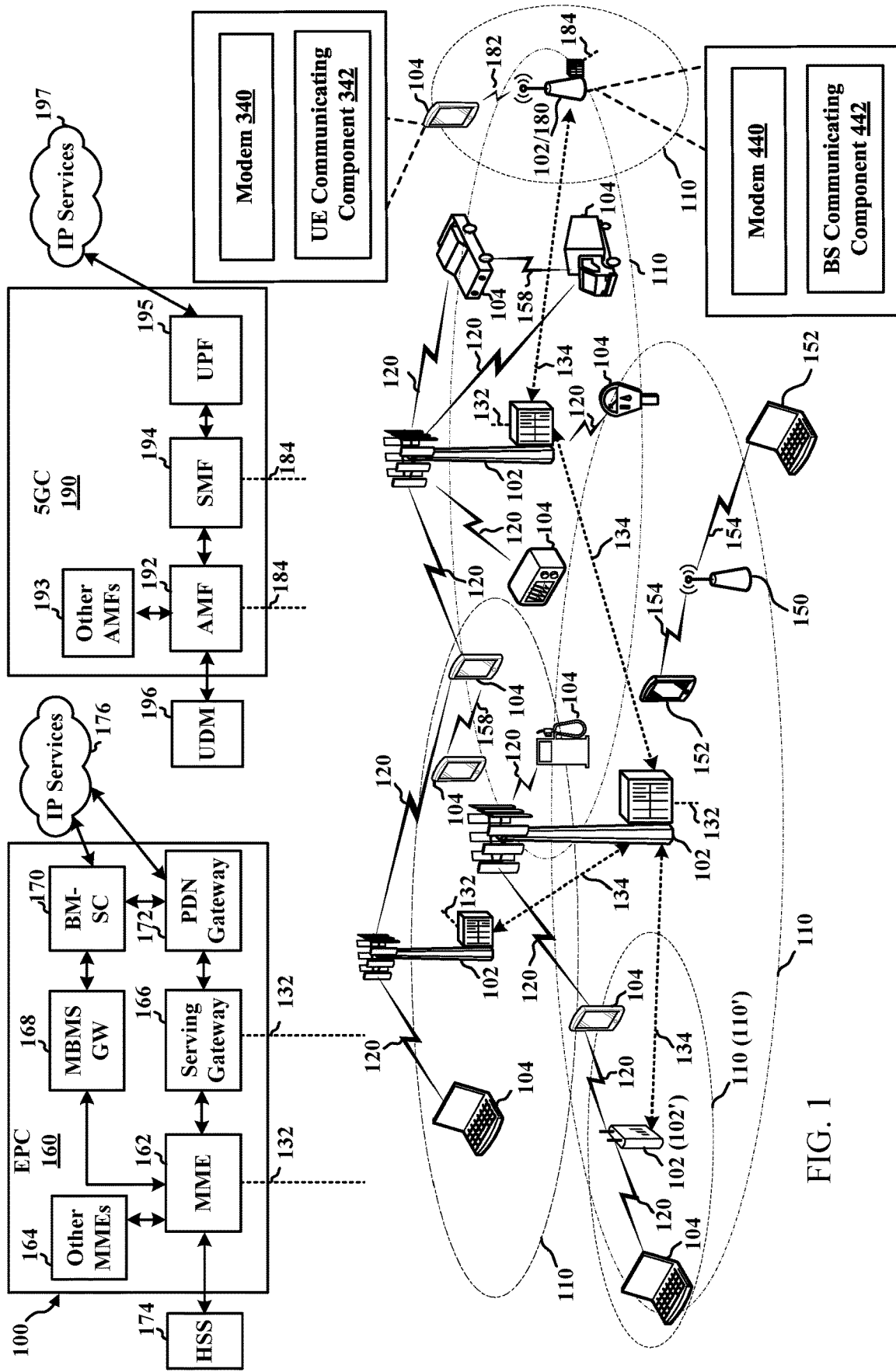
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating predicted channel state information (CSI) reports between devices or nodes of a wireless network. For example, a device, such as a user equipment (UE) in fifth generation (5G) new radio (NR) or other wireless communication technologies, can transmit predicted CSI reports to a network node that schedules resources for the device to use in communicating in the wireless network. The network node can accordingly adjust one or more parameters for the device to use in communicating in upcoming resources based on the predicted CSI reports. For example, the device can predict the CSI for a channel corresponding to the scheduled resources based on sensed current or historical channel activity, based on information regarding channel resources granted to the device or other devices in a current or future time interval, based on detected trends, based on one or more artificial intelligence or machine learning models, etc. For example, for AI- or ML-model based CSI report prediction, a set of inputs can be specified for the AI- or ML-model, and a corresponding output of CSI or CSI-related reporting value can be generated. For example, the set of inputs may include parameters defining a timing or time interval (e.g., symbol index, slot index, etc.) of a corresponding communications resource, a frequency (e.g., subcarrier index, resource block (RB) index, etc.) of the communications resource, and/or a spatial property (e.g., spatial layer index) of the communications resource, historical CSI reports, location of the UE, a cell identifier of the cell for which the CSI is to be reported, etc. Various mechanisms are defined for generating predicted CSI reports, such as, but not limited to, those described in U.S. patent application Ser. No. 17/653,996, entitled "SOFT INTERFERENCE PREDICTION IN A WIRELESS COMMUNICATIONS SYSTEM,"

U.S. patent application Ser. No. 17/813,841, entitled "PARTIAL CHANNEL STATE INFORMATION REPORTING," and U.S. patent application Ser. No. 18/162,485, entitled "CHANNEL STATE INFORMATION PREDICTION WITH BEAM UPDATE." In any case, the predicted CSI report can provide an indication of the CSI predicted by the device for the channel in an upcoming time interval, and the network node can use this information to adjust communication parameters for the device to use in communicating over the channel in the upcoming time interval.

For example, in 5G NR, a semi-persistent scheduling (SPS) configuration can include radio resource control (RRC) signaling to configure SPS periodicity and hybrid automatic repeat/request (HARQ)-acknowledgement (ACK) feedback resources. A network node, such as a gNB, can transmit the RRC signaling to a device, such as a UE, to configure the SPS periodicity and corresponding HARQ-ACK feedback resources. In addition, the gNB can use SPS activation downlink control information (DCI) signaling to activate certain configured SPS, where the activation DCI can include transmission parameters used by the network node in transmitting associated downlink data signaling, such as modulation and coding scheme (MCS), resource block (RB) allocation, antenna ports, etc. for the downlink data signaling (e.g., the SPS transmission). In addition, the gNB can use a reactivation DCI to change one or more of the transmission parameters, or a release DCI to deactivate configured SPS resources.

In an example, a device can transmit channel feedback to the network node, which can include CSI feedback (e.g., channel quality indicator (CQI), precoding matrix indicator (PMI), rank indicator (RI), etc.). CQI reporting can include an index to maximum possible modulation order and code rate to achieve a target block error rate (BLER) and can be provided per codeword (e.g., one or two CQI values may be reported, which may or may not use differential coding for the second CQI value based on the first CQL value). When gNB sends a batch of data or configured transmissions, it may adjust MCS over time based on at least one of channel prediction or interference prediction, which may be received from the UE. When DCI triggers a CSI prediction report from UE to gNB, the UE can adjust the prediction time to each allocated data. For example, the UE can use current measurements of interference and channel to determine prediction of at least one of CQI/MCS, RI, PMI, etc., and can send the information to the network node to adjust transmission parameters. There may be ranking of such information so that if report configuration cannot support sending all of the information, then the UE can discard some reports.

In accordance with aspects described herein, an activation DCI in SPS or a DCI received before activation DCI can be used trigger a predicted CSI report. For example, a network node can transmit the activation DCI in SPS or a DCI before the activation DCI, to the UE. The UE can accordingly receive the DCI as the trigger and can generate a predicted CSI report for transmitting to the network node to indicate CSI predicted for an upcoming configured SPS resource. In one example, the UE can transmit the predicted CSI report multiplexed with HARQ-ACK or other control information. The network node can receive the predicted CSI report and can modify one or more transmission parameters for one or more upcoming configured SPS resources. In an example, the UE can transmit the predicted CSI report based on a periodicity or other parameters, which may be configured by the network node in some examples. Moreover, in some examples, the UE can defer predicted CSI reporting where resources for transmitting the predicted CSI report collide with uplink resources used for other transmissions, such as HARQ-ACK feedback. In addition, in some examples, the UE can generate and transmit a bundled predicted CSI report including multiple predicted CSI for multiple upcoming configured SPS resources. Additionally, in some examples, the UE can select, or be configured with, one of multiple configured component carriers (CCs) over which to transmit the predicted CSI report.

In addition, aspects described herein can be similarly applied for channel prediction for uplink channels. For example, the UE can generate and transmit transmitting matrix precoding indicator (TPMI) or scheduling request indicator (SRI) predictions or recommendations to the network node, and the network node can accordingly adjust parameters for transmitting uplink communications in upcoming configured grant (CG) resources based on the TPMI or SRI predictions or recommendations. For example, the network node can adjust the parameters by indicating or configuring the TPMI suggested by the UE.

In accordance with aspects described herein, a UE or other device can transmit predicted CSI reports or TPMI, SRI, etc. to a network node, which the network node can use in adjusting communication parameters for the device in upcoming time intervals configured for downlink or uplink transmissions. In this regard, the network node can optimize resource usage for communications with the UE for periodically configured communication resources. This can conserve radio resources used by the network node and/or UE, which can improve performance, power consumption, etc., and thus user experience when using the UE or other device.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for transmitting a predicted channel report indicating predicted channel information for a channel, in accordance with aspects described herein. In addition, some nodes may have a modem 440 and BS communicating component 442 for receiving and processing a predicted channel report, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers.

The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (CNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can generate and/or transmit predicted channel reports to indicate predicted channel information for upcoming resource allocations. For example, UE communicating component 342 can generate or transmit a predicted channel report based on DCI received indicating to send the predicted channel report for one or more upcoming resource allocations. For example, the upcoming resource allocations can include scheduled resources that are activated by DCI, such as SPS configured resources (e.g., for downlink resources), CG resources (e.g., for uplink resources), and/or the like. In an example, BS communicating component 442 can receive the predicted channel report and can adjust parameters for communicating in an upcoming time interval corresponding to the configured resources based on the predicted channel information.

Figure 2:
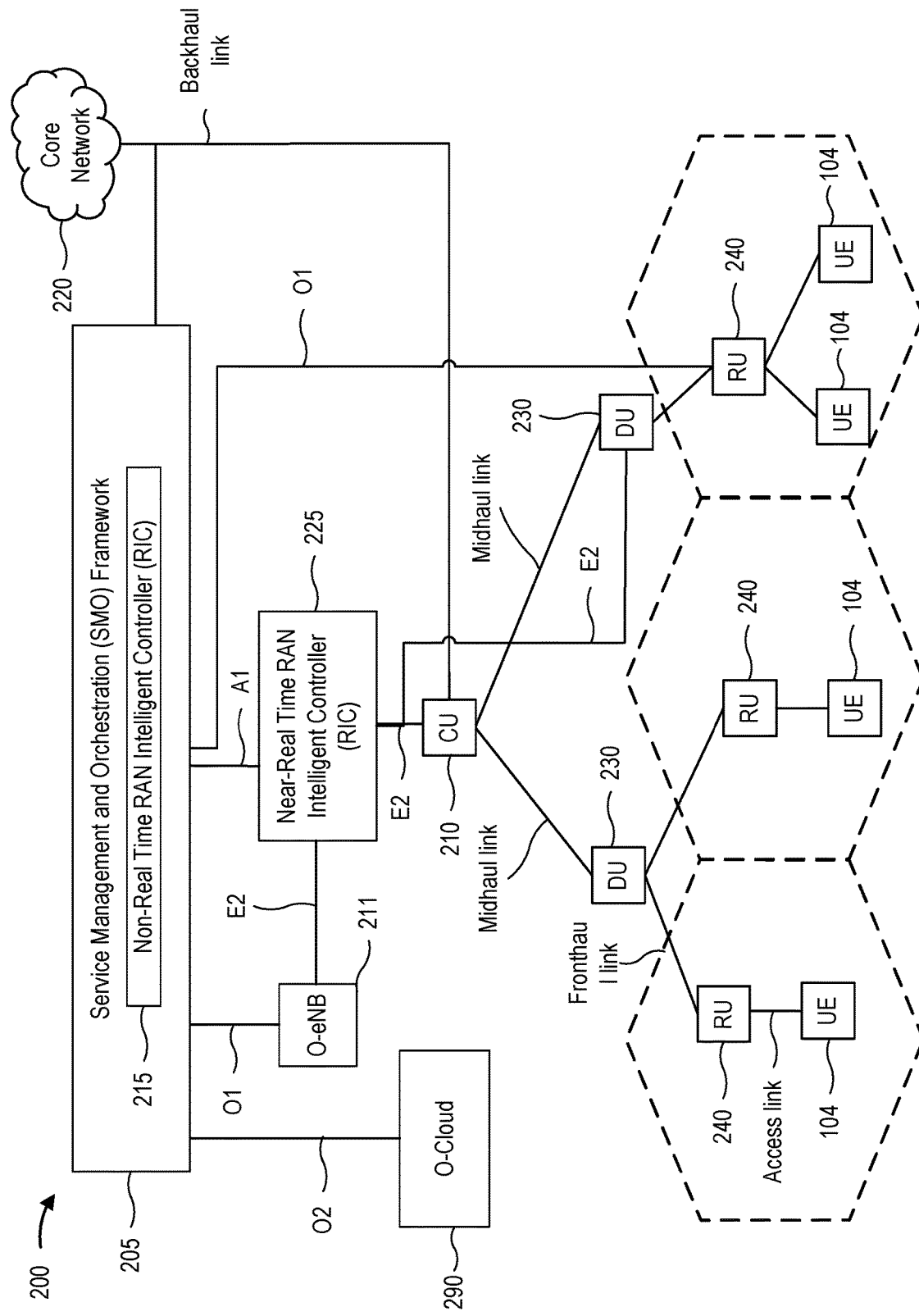
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-10, aspects are depicted with reference to one or more components and one or more methods that may perform the actions or operations described herein, where aspects in dashed line may be optional. Although the operations described below in FIGS. 5-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
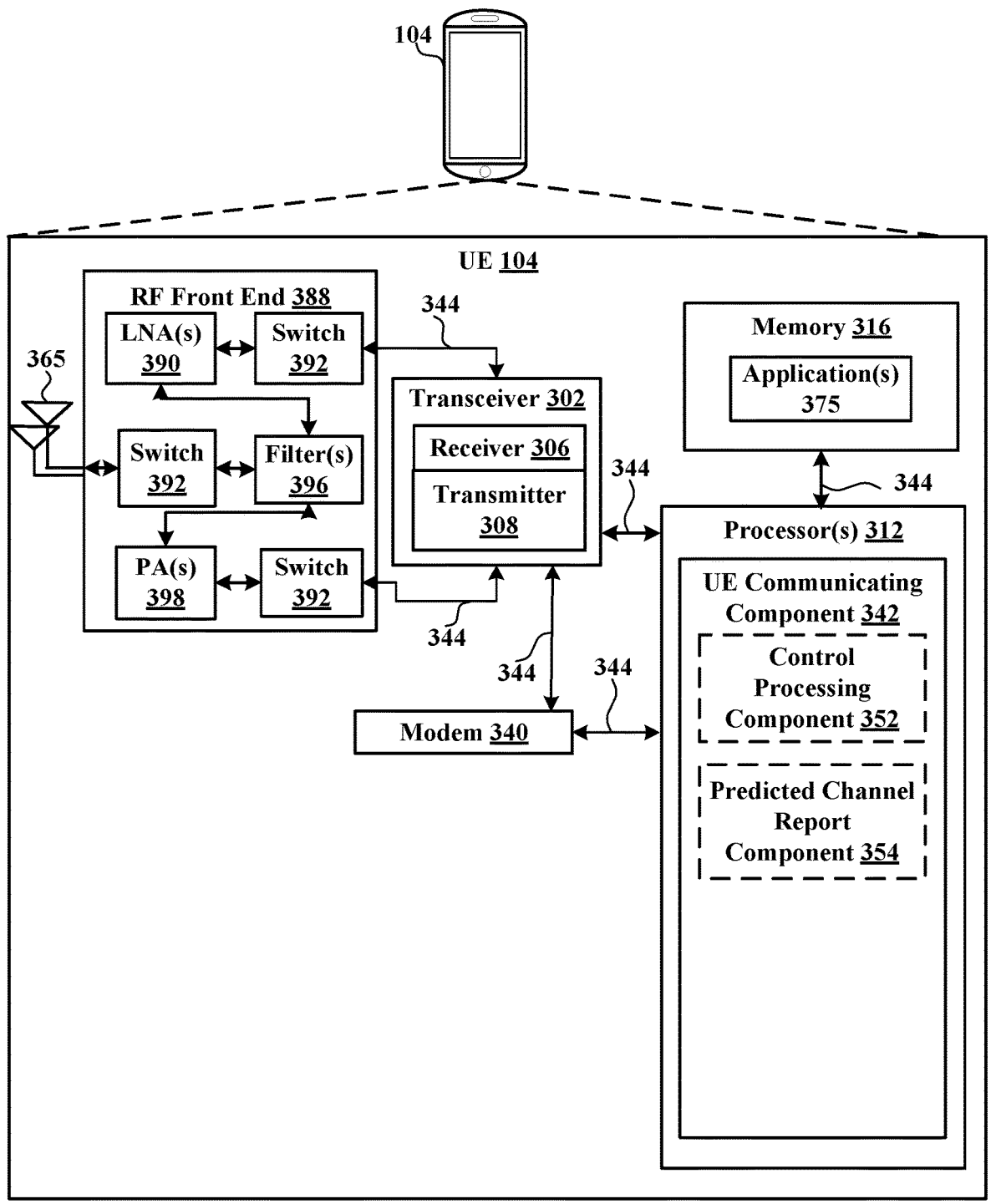
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for transmitting a predicted channel report indicating predicted channel information for a channel, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a control processing component 352 for processing control information related to activating periodically configured resources, such as SPS for downlink resources, CG for uplink resources, etc., and/or a predicted channel report component 354 for generating and/or transmitting a predicted channel report having predicted channel information for channel resources in an upcoming time interval (e.g., based on a periodicity of the periodically configured resources).

In an aspect, the processor(s) 312 may correspond to one or more of the processors described in connection with the UE in FIG. 10. Similarly, the memory 316 may correspond to the memory described in connection with the UE in FIG. 10.

Figure 4:
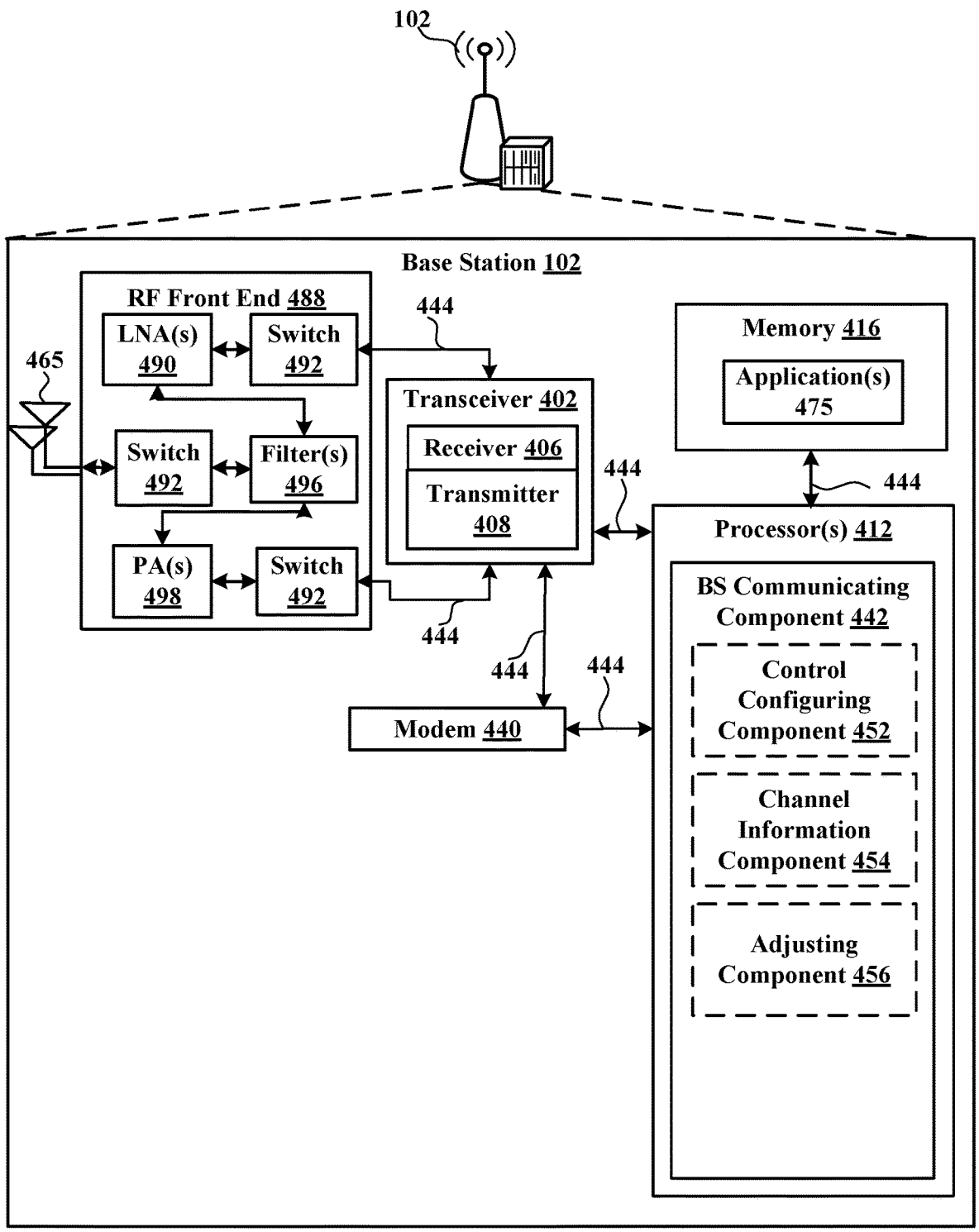
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for receiving and processing a predicted channel report, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a control configuring component 452 for generating and/or transmitting control information related to periodically configured resources, such as a periodicity for the resources, an activation DCI to activate periodically configured resources, etc., a channel information component 454 for obtaining channel information predicted for a channel in an upcoming time interval, an adjusting component 456 for adjusting one or more parameters for communicating over the channel, which may be based on a predicted channel report.

In an aspect, the processor(s) 412 may correspond to one or more of the processors described in connection with the base station in FIG. 10. Similarly, the memory 416 may correspond to the memory described in connection with the base station in FIG. 10.

Figure 5:
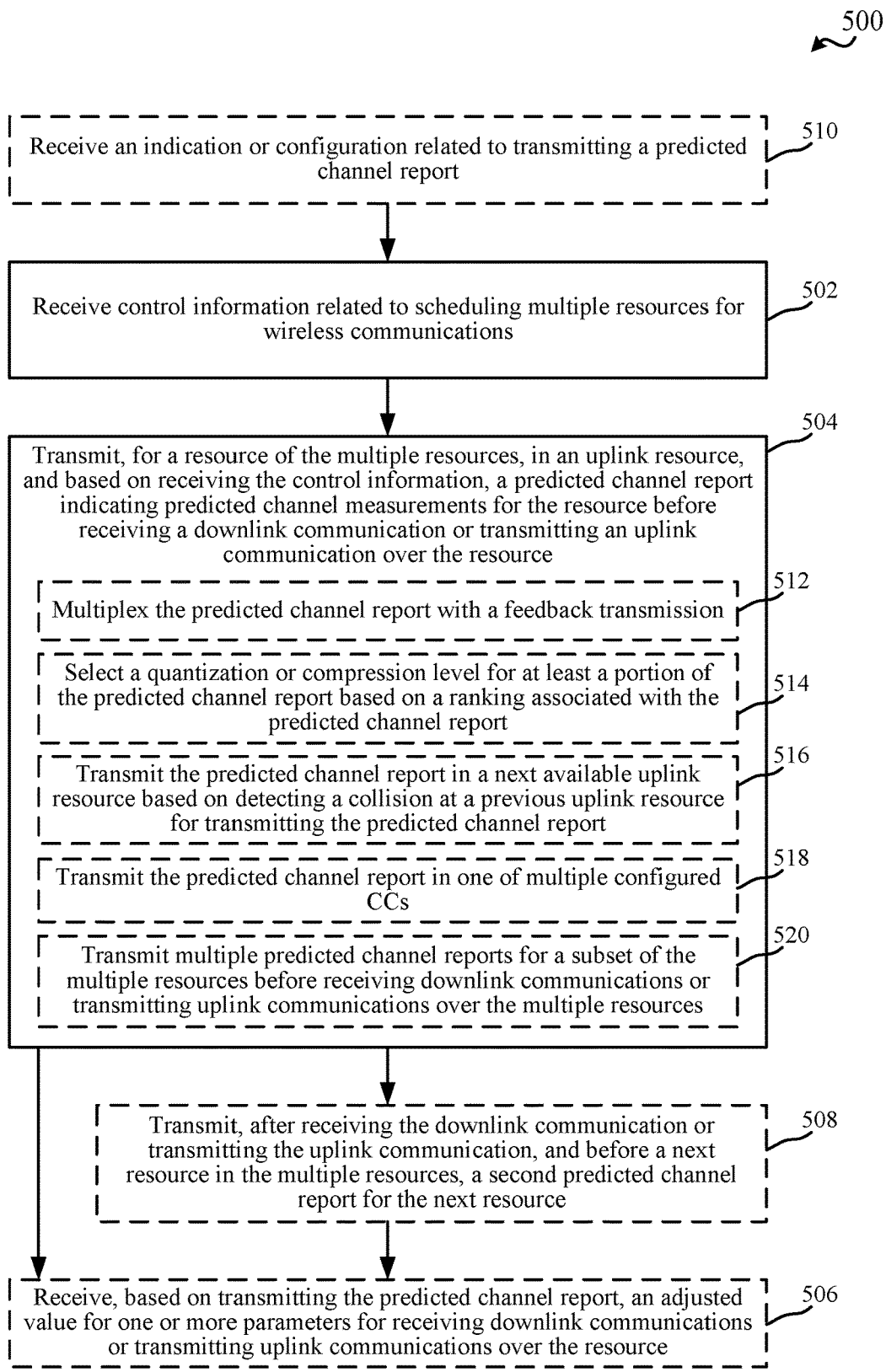
FIG. 5 is a flow chart illustrating an example of a method for transmitting a predicted channel report, in accordance with aspects described herein.
Figure 6:
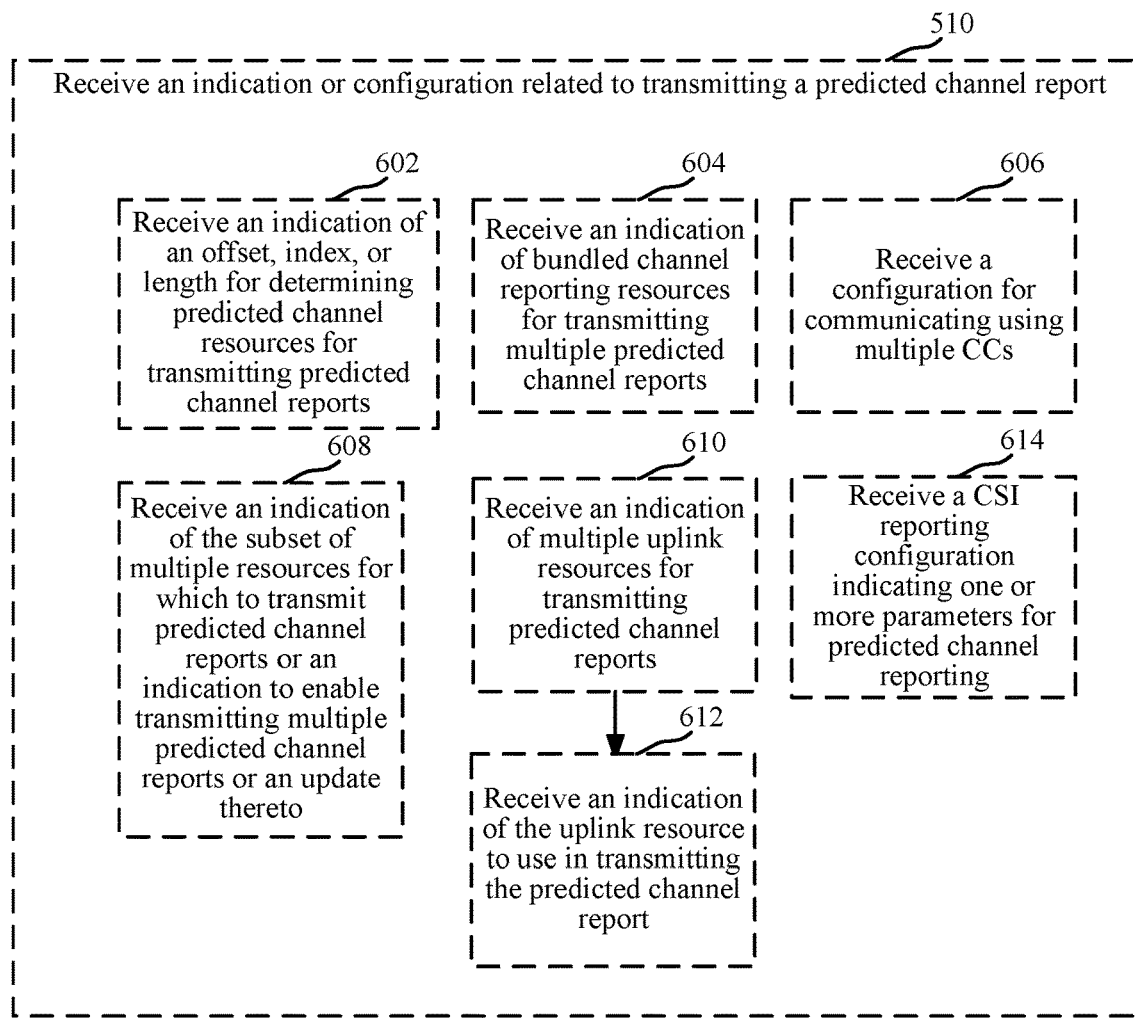
FIG. 6 is a flow chart illustrating an example of a method for receiving an indication or configuration related to transmitting a predicted channel report, in accordance with aspects described herein.
Figure 7:
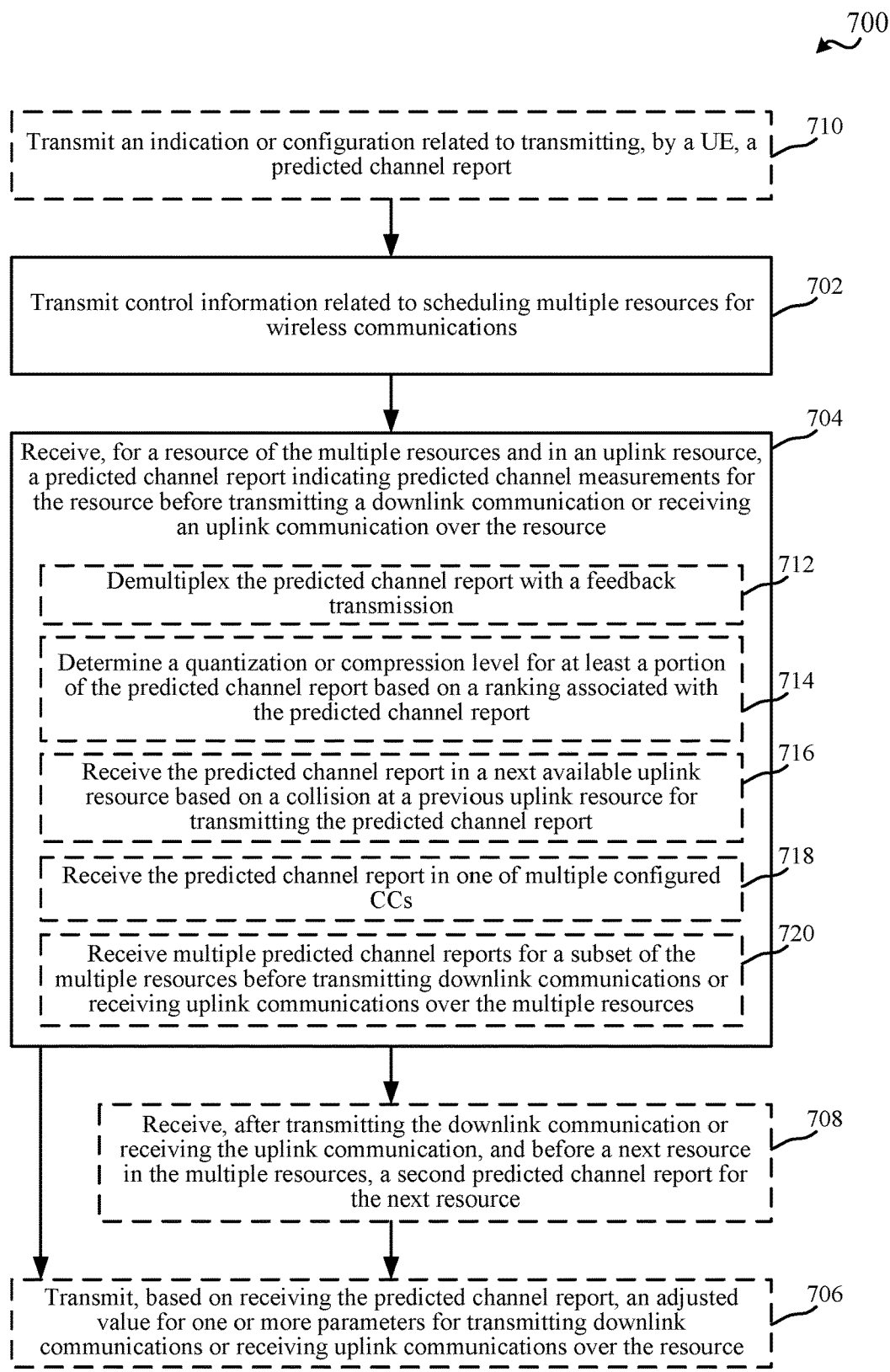
FIG. 7 is a flow chart illustrating an example of a method for receiving or processing a predicted channel report, in accordance with aspects described herein.
Figure 8:
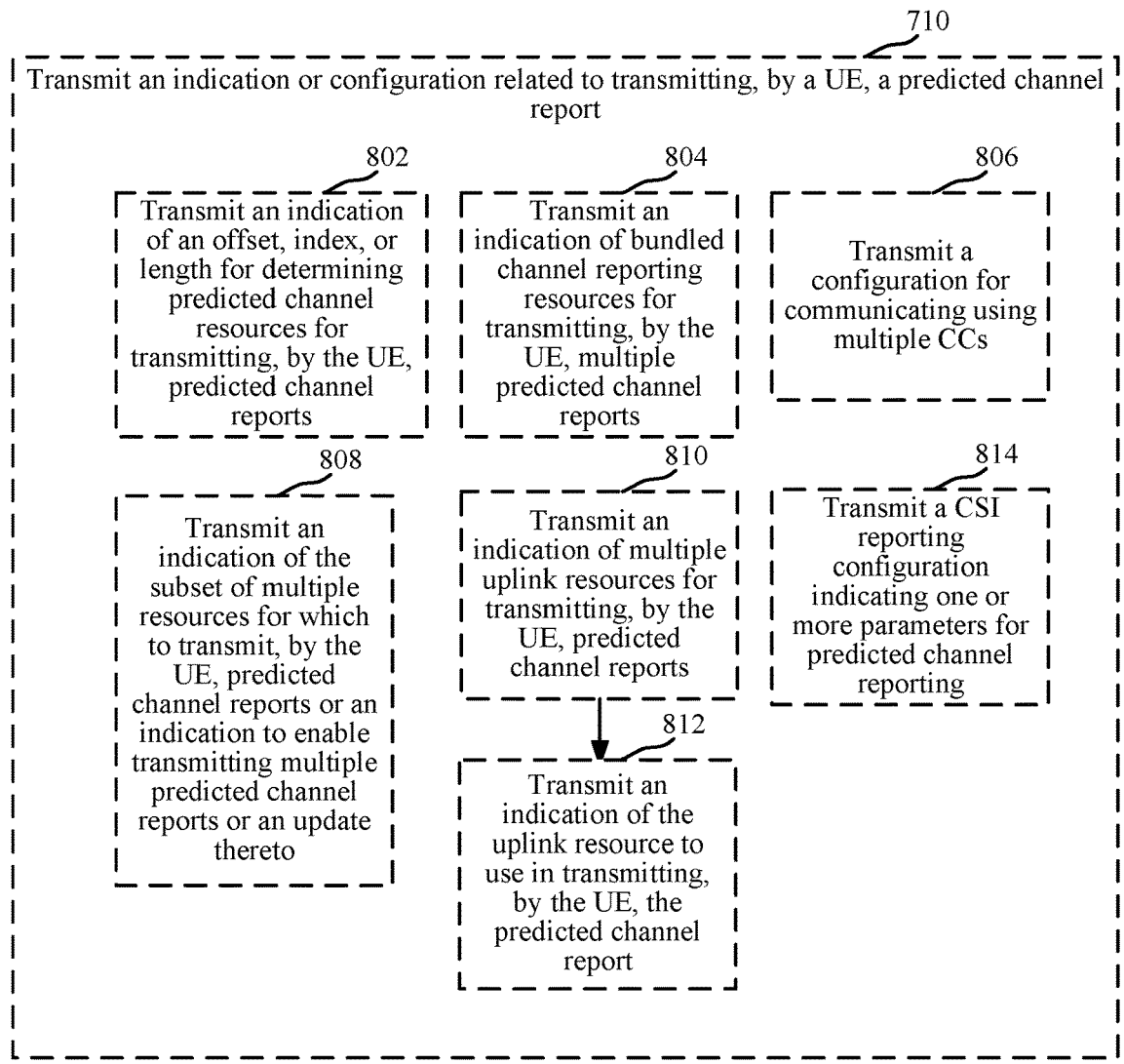
FIG. 8 is a flow chart illustrating an example of a method for transmitting an indication or configuration related to transmitting a predicted channel report, in accordance with aspects described herein.

FIG. 5 illustrates a flow chart of an example of a method 500 for transmitting a predicted channel report, in accordance with aspects described herein. FIG. 6 illustrates a flow chart of an example of a method for receiving an indication or configuration related to transmitting a predicted channel report, in accordance with aspects described herein. In an example, a UE 104 or other device (e.g., an IoT device, EH device, etc.) can perform the functions described in method 500 shown in FIGS. 5 and/or 6 using one or more of the components described in FIGS. 1 and 3. FIG. 7 illustrates a flow chart of an example of a method 700 for receiving or processing a predicted channel report, in accordance with aspects described herein. FIG. 8 illustrates a flow chart of an example of a method for transmitting an indication or configuration related to transmitting a predicted channel report, in accordance with aspects described herein. In an example, a network node (e.g., a base station 102 or gNB 180, a monolithic base station or gNB, a portion of a disaggregated base station or gNB, etc.), a UE 104 in sidelink communications, etc. can perform the functions described in method 700 shown in FIGS. 7 and/or 8 using one or more of the components described in FIGS. 1 and 4. Methods 500 and 700 are described in conjunction with one another for case of explanation; however, the methods 500 and 700 are not required to be performed together and indeed can be performed independently using separate devices.

In method 700, at Block 702, control information related to scheduling multiple resources for wireless communications can be transmitted. In an aspect, control configuring component 452, e.g., in conjunction with processor(s) 412, memory 416, transceiver 402, BS communicating component 442, etc., can transmit the control information related to scheduling multiple resources for wireless communications. For example, the control information can include one or more parameters related to scheduling periodic resources for a UE, such as one of SPS for multiple downlink resources for receiving, by the UE, downlink communications or CG scheduling for multiple uplink resources for transmitting, by the UE, uplink communications. For example, control configuring component 452 can transmit RRC signaling indicating possible resources that can be activated for downlink or uplink communications. For example, the RRC signaling can indicate a periodicity of periodic resources, such as SPS resources, CG resources, etc. In addition, in this example, the control information can also include DCI to activate the periodic resources. Moreover, in some examples, the control information can include control information to update or adjust parameters of previously activated periodic resources, control information to deactivate previously activated periodic resources, etc.

In method 500, at Block 502, control information related to scheduling multiple resources for wireless communication can be received. In an aspect, control processing component 352, e.g., in conjunction with processor(s) 312, memory 316, transceiver 302, UE communicating component 342, etc., can receive the control information scheduling the multiple resources for wireless communication. For example, this can include receiving, e.g., from a network node or other node that schedules the UE 104 for wireless communication, RRC signaling scheduling periodic resources, such as SPS resources, CG resources, etc., as described above. In other examples, this may include receiving DCI activating, adjusting, or deactivating the scheduled periodic resources.

In method 500, at Block 504, a predicted channel report indicating predicted channel measurements for a resource of the multiple resources, can be transmitted, in an uplink resource and based on receiving the control information, before receiving a downlink communication or transmitting an uplink communication over the resource. In an aspect, predicted channel report component 354, e.g., in conjunction with processor(s) 312, memory 316, transceiver 302, UE communicating component 342, etc., can generate and/or transmit, for the resource of the multiple resources, in an uplink resource, and based on receiving the control information, the predicted channel report indicating the predicted channel measurements for the resource before receiving the downlink communication or transmitting the uplink communication over the resource. For example, the predicted channel report can include predicted channel measurements for a channel corresponding to the periodic resources in upcoming time intervals of the periodic resources (e.g., in time intervals defined by the periodicity of the periodic resources). For example, the predicted channel report can include predictions on CSI feedback for a downlink channel in the upcoming time intervals (e.g., CQI, PMI, RI, etc.), suggestions for TPMI or SRI for an uplink channel in the upcoming time intervals, etc. In one example, predicted channel report component 354 can generate the predicted channel report based on current measurements of interference to determine prediction of CQI/MCS, PMI, RI, etc., previous measurements of interference in previous time intervals, etc. For example, predicted channel report component 354 can measure certain signals from the network node for generating the predicted channel report, such as a CSI-reference signal (RS), CSI-interference management (IM) signal, punctured PDSCH (punctured data or punctured demodulation reference signal (DMRS)) or synchronization signal block (SSB) or tracking reference signal (TRS) or PDSCH (e.g., DMRS or log likelihood ratios (LLRs)) received from the network node.

In an example, the resource for which the predicted channel report is generated and/or transmitted can be an upcoming resource defined by the periodic resource scheduling (e.g., based on a configured periodicity of SPS resources or CG resources). In addition, for example, the uplink resource over which the predicted channel report is transmitted can be indicated in the received control information. For example, an activation DCI may explicitly or implicitly indicate the uplink resources for transmitting the predicted channel report along with the SPS or CG resources being activated. In an example, the predicted channel report can correspond to the SPS or CG resources being activated or a next SPS or CG resource based on the configured periodicity. An example is illustrated in FIG. 9

Figure 9:
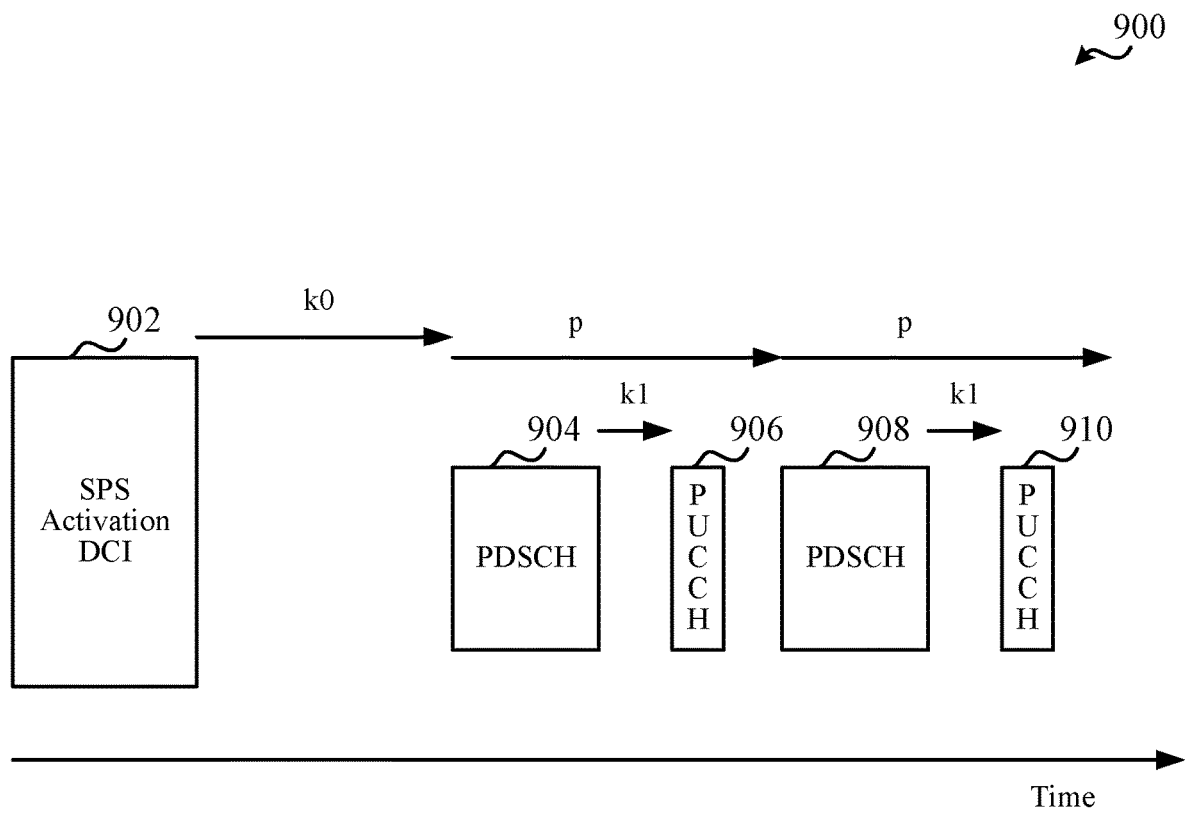
FIG. 9 illustrates a specific example of a timeline for periodic resources and transmitting a predicted channel report, in accordance with aspects described herein.

FIG. 9 illustrates a specific example of a timeline 900 for periodic resources and transmitting a predicted channel report. In timeline 900, for example, a base station 102 (or other device) can transmit a SPS activation DCI 902 to a UE 104 (or other device). The SPS activation DCI 902 can relate to or otherwise indicate parameters for receiving a downlink channel, such as physical downlink shared channel (PDSCH) 904, or transmitting an uplink channel, such as physical uplink shared channel (PUSCH), over periodic resources. The periodic resources can have a periodicity p, a starting offset k0 (e.g., the start of the SPS or CG), a feedback offset k1 for transmitting PUCCH 906 indicating feedback for the PDSCH 904, an RB allocation, MCS, TBS, etc. For example, RRC signaling can be used to configure the periodic resources (e.g., SPS or CG resources), as described above, and can configure the periodicity p, the starting offset k0, and/or the like.

In one example, predicted channel report component 354 can transmit the precited channel report for the channel in an upcoming configured resource, such as PDSCH 908, in PUCCH 906. For example, predicted channel report component 354 can transmit the HARQ-ACK for the last PDSCH (e.g., PDSCH 904) and the predicted CSI (at time k0+p from receiving the SPS activation DCI 902) so that the network node can receive the predicted CSI and schedule the next MCS (e.g., if the delta between the MCS for the configured resource and the MCS based on the predicted CSI is at least a threshold delta). For example, activation DCI in SPS or a DCI received before activation DCI, can trigger a predicted channel report (e.g., CSI report, such as CQI/RI/PMI/beam) multiplexed with each HARQ-ACK or received from UE on different UL (e.g., PUCCH/PUSCH resources) at least X symbols before a next configured grant occasion (composed of one or more of PDSCHs). As such, for example, control configuring component 452 can transmit the activation DCI or DCI before the activation DCI to trigger a predicted channel report, control processing component 352 can receive the activation DCI or DCI before the activation DCI, and predicted channel report component 354 can generate and transmit the predicted channel report for the channel based on receiving the trigger.

In some examples, predicted channel report component 354 can transmit the predicted channel report in layer 1 (L1, e.g., physical (PHY) layer), layer 2 (L2, e.g., media access control (MAC) layer), or layer 3 (L3, e.g., RRC) indication, which may include one or more of L3 user assistance information (UAI) signaling, piggybacked or multiplexed L1, L2, L3 signaling, etc. For example, predicted channel report component 354 can transmit the predicted channel report with a measured channel report (e.g., a regular CSI report), such as a periodic or aperiodic or semi-persistent CSI report. In another example, predicted channel report component 354 can transmit the predicted channel report with a HARQ-ACK, a buffer status report (BSR), a scheduling request (SR), a power headroom report (PHR), a PUSCH allocation, a random access channel (RACH) message, a wake-up signal (WUS), such as connected mode-WUS (C-WUS), and/or the like.

In method 700, at Block 704, a predicted channel report indicating predicted channel measurements for a resource of the multiple resources, can be received, in an uplink resource, before transmitting a downlink communication or receiving an uplink communication over the resource. In an aspect, channel information component 454, e.g., in conjunction with processor(s) 412, memory 416, transceiver 402, BS communicating component 442, etc., can receive, for a resource of the multiple resources and in an uplink resource, a predicted channel report indicating predicted channel measurements for the resource before transmitting the downlink communication or receiving the uplink communication over the resource. In an example, channel information component 454 can receive the predicted channel report in uplink control channel resources, such as PUCCH (e.g., PUCCH 906 in FIG. 9), which may indicate predicted channel information for one or more upcoming periodic channel resources (e.g., PDSCH 908 in FIG. 9), which may include predicted CSI (e.g., CQI/MCS, PMI, RI, etc.), suggested TPMI, SRI, etc.

In method 700, optionally at Block 706, an adjusted value for one or more parameters for transmitting downlink communications or receiving uplink communications over the resource can be transmitted based on receiving the predicted channel report. In an aspect, adjusting component 456, e.g., in conjunction with processor(s) 412, memory 416, transceiver 402, BS communicating component 442, etc., can transmit, based on receiving the predicted channel report, the adjusted value for the one or more parameters for transmitting downlink communications or receiving uplink communications over the resource. In one example, adjusting component 456 can transmit the adjusted value for the one or more parameters using a reactivation DCI for the upcoming scheduled resource. For example, adjusting component 456 can adjust transmit parameters for downlink communications, such as MCS, RB allocation, antenna ports, etc. for the SPS transmission in the upcoming periodic resource, and/or can indicate the adjusted parameters to the UE 104 for receiving the downlink communications. In another example, adjusting component 456 can adjust transmit parameters for the UE 104 to use in transmitting uplink communications, such as TPMI, SRI, etc., and can indicate the transmit parameters to the UE 104 to use in transmitting an uplink communication in the upcoming periodic resource.

In method 500, optionally at Block 506, an adjusted value for one or more parameters for receiving downlink communications or transmitting uplink communications over the resource can be received based on transmitting the predicted channel report. In an aspect, control processing component 352, e.g., in conjunction with processor(s) 312, memory 316, transceiver 302, UE communicating component 342, etc., can receive, based on transmitting the predicted channel report, the adjusted value for one or more parameters for receiving downlink communications or transmitting uplink communications over the resource. For example, control processing component 352 can receive the adjusted value for the one or more parameters in a reactivation DCI, as described above. In an example, UE communicating component 342 can accordingly adjust the one or more parameters for receiving downlink communications, or transmitting uplink communications, over the upcoming periodic resource.

In method 500, optionally at Block 508, a second predicted channel report for the next resource can be transmitted, after receiving the downlink communication or transmitting the uplink communication and before a next resource in the multiple resources. In an aspect, predicted channel report component 354, e.g., in conjunction with processor(s) 312, memory 316, transceiver 302, UE communicating component 342, etc., can transmit, after receiving the downlink communication or transmitting the uplink communication, and before a next resource in the multiple resources, a second predicted channel report for the next resource. For example, referring to FIG. 9, for SPS, predicted channel report component 354 can send a set of predicted channel reports (e.g., CSI) at times k0+p, k0+2p, k0+3p, etc., from receiving the DCI, where p is the periodicity of the scheduled resources (e.g., SPS resources).

In method 700, optionally at Block 708, a second predicted channel report for the next resource can be received, after transmitting the downlink communication or receiving the uplink communication and before a next resource in the multiple resources. In an aspect, channel information component 454, e.g., in conjunction with processor(s) 412, memory 416, transceiver 402, BS communicating component 442, etc., can receive, after transmitting the downlink communication or receiving the uplink communication, and before a next resource in the multiple resources, the second predicted channel report for the next resource. As described, for example, channel information component 454 can receive, from the UE 104, predicted channel reports from a time of transmitting the activation DCI activating multiple periodic resources plus the periodicity, or a multiple of the periodicity.

In method 700, optionally at Block 708, a second predicted channel report for the next resource can be transmitted, after transmitting the downlink communication or receiving the uplink communication and before a next resource in the multiple resources. In an aspect, control configuring component 452, e.g., in conjunction with processor(s) 412, memory 416, transceiver 402, BS communicating component 442, etc., can transmit the indication or configuration related to transmitting the predicted channel report. For example, control configuring component 452 can transmit the indication or configuration using RC signaling, media access control (MAC)-control element (CE), DCI, etc.

In method 500, optionally at Block 510, an indication or configuration related to transmitting a predicted channel report can be received. In an aspect, control processing component 352, e.g., in conjunction with processor(s) 312, memory 316, transceiver 302, UE communicating component 342, etc., can receive the indication or configuration related to transmitting the predicted channel report. In an example, control processing component 352 can receive the indication or configuration from a network node, or other device, in RRC signaling, MAC-CE, DCI, etc. Predicted channel report component 354 can generate and/or transmit the predicted channel report based on the indication or configuration, or corresponding parameters, as received.

In one example, in transmitting the indication or configuration at 710, optionally at Block 802, an indication of an offset, index, or length for determining predicted channel reports for transmitting, by the UE, predicted channel reports can be transmitted. In an aspect, control configuring component 452, e.g., in conjunction with processor(s) 412, memory 416, transceiver 402, BS communicating component 442, etc., can transmit the indication of the offset, index, or length for determining predicted channel resources for transmitting, by the UE, the predicted channel reports. In this example, channel information component 454 can receive the predicted channel reports based on the indicated offset, index, or length, and/or may determine to which upcoming resources the predicted channel report relates.

In one example, in receiving the indication or configuration at 510, optionally at Block 602, an indication of an offset, index, or length for determining predicted channel reports for transmitting predicted channel reports can be received. In an aspect, control processing component 352, e.g., in conjunction with processor(s) 312, memory 316, transceiver 302, UE communicating component 342, etc., can receive the indication of the offset, index, or length for determining predicted channel resources for transmitting the predicted channel reports. For example, control configuring component 452 can transmit, and/or control processing component 352 can receive, an indication of an index n and length L for the UE to use in transmitting predicted channel reports. Referring to FIG. 9, for example, the UE can compute and/or transmit predicted channel report (e.g., CSI) at k0+n*p to k0+ (n+L)*p.

In transmitting the predicted channel report at Block 504, optionally at Block 512, the predicted channel report can be multiplexed with a feedback transmission. In an aspect, predicted channel report component 354, e.g., in conjunction with processor(s) 312, memory 316, transceiver 302, UE communicating component 342, etc., can multiplex the predicted channel report with the feedback transmission, which may include a HARQ-ACK transmission in PUCCH resources. In receiving the predicted channel report at Block 704, optionally at Block 712, the predicted channel report can be demultiplexed with a feedback transmission. In an aspect, channel information component 454, e.g., in conjunction with processor(s) 412, memory 416, transceiver 402, BS communicating component 442, etc., can demultiplex the predicted channel report with the feedback transmission, such as from a HARQ-ACK transmission received in PUCCH resources from the UE.

In an example, there may be a ranking for reporting of predicted channel reports so if the report configuration does not support sending some of the collected predicted channel information, some reports can be discarded. Ranking may include information related to different quantization and compression level for predicted measurements. In some examples, earlier predicted channel measurements may use higher resolution, as the prediction may be relevant sooner than the later predicted channel measurements. Thus, in some examples, transmitting the predicted channel measurements at Block 504, and/or receiving the predicted channel measurements at Block 704, may be based on such ranking. For example, predicted channel report component 354 can generate the predicted channel report to include information based on the ranking, such as to include earlier channel measurements and modify later channel measurements to achieve a threshold report size, and channel information component 454 can receive and process the predicted channel report using the information included based on the ranking. Modification of the later channel measurements can include discarding the later channel measurements, quantizing the later channel measurements to a lower resolution set of values, compressing the later channel measurements, etc.

In transmitting the predicted channel report at Block 504, optionally at Block 514, a quantization or compression level can be selected for at least a portion of the predicted channel report based on a ranking associated with the predicted channel report. In an aspect, predicted channel report component 354, e.g., in conjunction with processor(s) 312, memory 316, transceiver 302, UE communicating component 342, etc., can select a quantization or compression level for at least a portion of the predicted channel report based on a ranking associated with the predicted channel report. For example, predicted channel report component 354 can select a higher quantization or compression level (e.g., resulting in a smaller size value for representing channel measurements) for predicted channel measurements corresponding to later upcoming scheduled resources than for sooner upcoming scheduled resources.

In receiving the predicted channel report at Block 704, optionally at Block 714, a quantization or compression level can be determined for at least a portion of the predicted channel report based on a ranking associated with the predicted channel report. In an aspect, channel information component 454, e.g., in conjunction with processor(s) 412, memory 416, transceiver 402, BS communicating component 442, etc., can determine a quantization or compression level for at least a portion of the predicted channel report based on a ranking associated with the predicted channel report. Channel information component 454 can determine the predicted channel measurements for each of multiple upcoming scheduled resources using the determined quantization or compression levels applied to received values, and adjusting component 456 can adjust parameters based on the predicted channel measurements.

In some examples, channel reporting can be deferred due to collision between a time division duplexing (TDD) pattern configured for the UE 104 or PUCCH being used for HARQ-ACK. In such examples, an expiry timer can be initialized for the deferred channel report, and the channel report can be transmitted in a next available uplink occasion if the expiry timer is not expired. For example, referring to FIG. 9, predicted channel report component 354 can determine to transmit a predicted channel report for the channel in upcoming resource, such as PUCCH 910, and/or additional upcoming resource (not shown) in PUCCH 906; however, predicted channel report component 354 may detect a collision in PUCCH 906 where the PUCCH 906 is in downlink resources indicated by a configured TDD pattern, or where HARQ-ACK is scheduled for transmission over PUCCH 906 can the predicted channel report is not multiplexed therewith. In this example, predicted channel report component 354 can defer transmitting the predicted channel report until a next occasion, which can be in the next PUCCH 910, or can be according to a time offset configured by the network node for the UE 104 or otherwise determined by the UE 104 based on the wireless communication technology standard. As described, for example, predicted channel report component 354 can initialize an expiry timer for the predicted channel report based on deferring reporting of the predicted channel report.

In transmitting the predicted channel report at Block 504, optionally at Block 516, the predicted channel report can be transmitted in a next available uplink resource based on detecting a collision at a previous uplink resource for transmitting the predicted channel report. In an aspect, predicted channel report component 354, e.g., in conjunction with processor(s) 312, memory 316, transceiver 302, UE communicating component 342, etc., can transmit the predicted channel report in a next available uplink resource based on detecting a collision at a previous uplink resource for transmitting the predicted channel report. In one example, predicted channel report component 354 can transmit the predicted channel report in the next available uplink resource based on detecting whether the predicted channel report has expired (e.g., based on the value of the expiry timer at the time of transmitting the predicted channel report).

In an example, where predicted channel report component 354 determines that the predicted channel report is expired, predicted channel report component 354 can drop a predicted channel quantity (e.g., CSI) from the report, or can send partial channel quantity. For example, when the channel measurement or other quantity expires, it becomes less useful. As such, for CSI for example, predicted channel report component 354 can send the CQI without necessarily sending other CSI feedback (e.g., PMI, RI, etc.). In another example, predicted channel report component 354 can reduce the reported RSRP quantities and/or can reduce the resolution by quantizing the values, as described, when the CSI is expired. In another example, predicted channel report component 354 can report RSRP of different beams and/or can drop a lowest RSRP prediction(s), etc., when the CSI is expired. This can reduce the resource used in transmitting the predicted channel report for expired reports. In an example, predicted channel report component 354 can initialize the expiry timer at the time of receiving the activation DCI, at a provided reference time, at a time for the originally scheduled predicted channel report that was deferred, at a time of the source measurement resource that is received by the UE 104 and based on which the predicted CSI is being reported. For example, the source measurement resource can include a CSI-RS or CSI-IM, punctured PDSCH (punctured data or punctured DMRS) or SSB or TRS or PDSCH (e.g., DMRS or LLRs) received from the network node and measured by the UE 104 for generating the predicted channel report.

In receiving the predicted channel report at Block 704, optionally at Block 716, the predicted channel report can be received in a next available uplink resource based on a collision at a previous uplink resource for transmitting the predicted channel report. In an aspect, channel information component 454, e.g., in conjunction with processor(s) 412, memory 416, transceiver 402, BS communicating component 442, etc., can receive the predicted channel report in a next available uplink resource based on a collision at a previous uplink resource for transmitting the predicted channel report. In this example, channel information component 454 can process the predicted channel report based on receiving the predicted channel report in the next available uplink resource, which can include interpreting the predicted channel report as including certain channel information (e.g., CQI and not PMI or RI, a reduced number of RSRP quantities or associated resolution, etc.) based on receiving the predicted channel report in the next available uplink resource.

In some examples, bundled predicted channel reporting resources can be defined and used for bundling predicted channel reports for multiple resources. For example, the bundled predicted channel reporting resources can be different from legacy resources for conventional (e.g., non-predicted) channel reporting, such as CSI reporting defined in 5G NR. In an example, the bundled predicted channel reporting resources can be different from resources defined or configured for HARQ-ACK feedback. In transmitting the indication or configuration at Block 710, optionally at Block 804, an indication of bundled channel reporting resources for transmitting, by the UE, multiple predicted channel reports can be transmitted. In an aspect, control configuring component 452, e.g., in conjunction with processor(s) 412, memory 416, transceiver 402, BS communicating component 442, etc., can transmit the indication of the bundled channel reporting resources for transmitting, by the UE, multiple predicted channel reports. For example, control configuring component 452 can transmit RRC signaling, MAC-CE, DCI, etc. that defines bundled CSI resources (CSI list resource) to be used for bundled predicted CSI. In receiving the indication or configuration at Block 510, optionally at Block 604, an indication of bundled channel reporting resources for transmitting multiple predicted channel reports can be received. In an aspect, control processing component 352, e.g., in conjunction with processor(s) 312, memory 316, transceiver 302, UE communicating component 342, etc., can receive the indication of the bundled channel reporting resources for transmitting multiple predicted channel reports.

For example, the predicted channel report can include more information (e.g., a greater number of bits) than conventional measured (e.g., non-predicted) channel reports due to the possibility to report predictions on more resources. As such, bundled predicted channel reports can be larger than bundled measured channel reports. In this example, if predicted channel reports are configured for the UE 104, the network node can use the new bundled resources for receiving predicted channel reports; otherwise, the network node can use legacy resources for measured channel reports.

In one example, tables for mapping accumulated predicted channel report payloads to sequences of resources (e.g., bundled resources) can be defined in a wireless communication technology, such as 5G NR, and as such, the UE 104 can be implemented with information regarding the tables for determining resources to use to transmit multiple predicted channel reports. In one example, as the accumulated payload increased, so to can the number of bundled resources mapped for transmitting the multiple predicted channel reports. In one example, in transmitting the indication of the bundled channel reporting resources at Block 804, control configuring component 452 can transmit an index of a bundled resource sequence defined in the wireless communication technology specification (e.g., 5G NR). In this example, control processing component 352 can receive the index and determine which resources map to the index for transmitting the multiple channel prediction reports.

In one example, control configuring component 452 can configure the UE 104 with a bitmap indicating for which bundle of periodic resources to generate predicted channel reports for transmitting to the network node. For example, control configuring component 452 can configure a bundle size, E, of resource occasions for which to report predicted channel information, and a bitmap, B, indicating for which bundles to report predicted channel information. For example, control configuring component 452 can transmit the configuration of E and/or B in RRC signaling, MAC-CE, DCI, etc. Control processing component 352 can receive the configuration, and can accordingly generate and transmit the predicted channel reports for bundled resource occasions. In one example, E can be the number of resource occasions per periodically configured resources (e.g., the number of PDSCHs per SPS occasion). In an example, control processing component 352 can continue to use the bitmap configuration until an updated configuration is received or the periodically configured resources are released (e.g., by release DCI). In an example, predicted channel report component 354 can transmit the predicted channel reports on the dedicated uplink resources before a given bundle of resource occasions having a bitmap value of "1."

In some examples, the UE 104 can be configured to communicate with multiple cells, such as a primary cell (PCell) configured by a network node serving the UE 104 (e.g., base station 102) and/or one or more secondary cells (SCell). In transmitting the indication or configuration at Block 710, optionally at Block 806, a configuration for communicating using multiple CCs can be transmitted. In an aspect, control configuring component 452, e.g., in conjunction with processor(s) 412, memory 416, transceiver 402, BS communicating component 442, etc., can transmit the configuration for using multiple CCs, which can include a PCell configuration and/or one or more SCell configurations. For example, control configuring component 452 can transmit RRC signaling, MAC-CE, DCI, etc. indicating the CC configuration. In receiving the indication or configuration at Block 510, optionally at Block 606, a configuration for communicating using multiple CCs can be received. In an aspect, control processing component 352, e.g., in conjunction with processor(s) 312, memory 316, transceiver 302, UE communicating component 342, etc., can receive the configuration for communicating using multiple CCs.

In an example, where multiple CCs are configured, predicted channel report component 354 can transmit a predicted channel report on the PCell, and perhaps not on any configured SCells. In another example, predicted channel report component 354 can transmit a predicted channel report on the fastest (in time) CC, which the UE 104 can measure and determine as the configured CC having the highest throughput. In one example, the configuration transmitted at Block 806, and/or received at Block 606, can include an indication of the CC to use to transmit predicted channel reports, which may change over multiple uplink resources. In one example, the configuration can indicate a pattern of CCs to use in transmitting predicted channel reports over multiple uplink resources over a period of time. In another example, the configuration can indicate groups of CCs and/or a ranking of the CCs for using based on time domain feasibility. In an example, predicted channel report component 354 can use the indicated CC for transmitting the predicted channel report over a given uplink resource.

In this example, in transmitting the predicted channel report at Block 504, optionally, at Block 518, the predicted channel report can be transmitted in one of multiple configured CCs. In an aspect, predicted channel report component 354, e.g., in conjunction with processor(s) 312, memory 316, transceiver 302, UE communicating component 342, etc., can transmit the predicted channel report in the one or more multiple configured CCs, which may be selected as described above. In this example, in receiving the predicted channel report at Block 704, optionally, at Block 718, the predicted channel report can be received in one of multiple configured CCs. In an aspect, channel information component 454, e.g., in conjunction with processor(s) 412, memory 416, transceiver 402, BS communicating component 442, etc., can receive the predicted channel report in the one or more multiple configured CCs.

For example, in transmitting the indication or configuration at Block 710, optionally at Block 808, an indication of the subset of multiple resources for which to transmit, by the UE, predicted channel reports or an indication to enable transmitting multiple predicted channel reports or an update thereto can be transmitted. In an aspect, control configuring component 452, e.g., in conjunction with processor(s) 412, memory 416, transceiver 402, BS communicating component 442, etc., can transmit the indication of the subset of multiple resources for which to transmit, by the UE, predicted channel reports or the indication to enable transmitting multiple predicted channel reports or the update thereto. For example, control configuring component 452 can transmit the indication in RRC signaling, MAC-CE, DCI, etc. In receiving the indication or configuration at Block 510, optionally at Block 608, an indication of the subset of multiple resources for which to transmit, by the UE, predicted channel reports or an indication to enable transmitting multiple predicted channel reports or an update thereto can be received. In an aspect, control processing component 352, e.g., in conjunction with processor(s) 312, memory 316, transceiver 302, UE communicating component 342, etc., can receive the indication of the subset of multiple resources for which to transmit predicted channel reports or the indication to enable transmitting multiple predicted channel reports or the update thereto. For example, the subset of multiple resources can correspond to the resource occasions for which the UE is to transmit predicted channel reports, as described above.

In some examples, reporting predicted channel information can be enabled and/or disabled by configuring the UE 104. For example, in scheduling DCI or activation DCI (e.g., in case of SPS), the network node can enable sending the prediction report on same resources as HARQ-ACK or in different resources, as described above. If different resources are used, for example, the PUCCH resources for predicted channel report can be configured in RRC/MAC-CE and/or indicated in DCI. For multi-PDSCH scheduled by single DCI or CG occasion, which can include resources for multiple PDSCHs per occasion, the UE 104 can send a predicted channel report including at least X (and most Y, where Y is number of PDSCH in a burst) or bitmap indicating which CSI prediction to send within the PDSCH bundle, as described. In one example, the network node can trigger for predicted channel report for multiple resource occasions (e.g., multiple PDSCH), which may include the number of PDSCHs for which the UE is to report predicted channel information (e.g., feedback MCS). Control configuring component 452 can transmit the trigger as dynamic, semi-static, etc., trigger, which may also be periodic, aperiodic, semi-persistent, etc. In one example, control config-uring component 452 can transmit the indication of resources, the indication to enable predicted channel reporting, etc., and/or an associated configuration of different parameters using L2/L3 signaling (e.g., MAC-CE/RRC). In another example, for SPS, control configuring component 452 can transmit the indication of resources, the indication to enable the feature and configuration of different parameters partially per SPS configuration in RRC (and/or can update the indication using MAC-CE or DCI, etc.).

In one example, in transmitting the indication or configuration at Block 710, optionally at Block 810, an indication of multiple uplink resources for transmitting, by the UE, predicted channel reports can be transmitted. In an aspect, control configuring component 452, e.g., in conjunction with processor(s) 412, memory 416, transceiver 402, BS communicating component 442, etc., can transmit the indication of the multiple resources for transmitting, by the UE, the predicted channel reports. For example, control configuring component 452 can transmit the indication in RRC signaling. In receiving the indication or configuration at Block 510, optionally at Block 610, an indication of multiple uplink resources for transmitting predicted channel reports can be received. In an aspect, control processing component 352, e.g., in conjunction with processor(s) 312, memory 316, transceiver 302, UE communicating component 342, etc., can receive the indication of the multiple resources for transmitting, by the UE, the predicted channel reports.

In addition, for example, in transmitting the indication or configuration at Block 710, optionally at Block 812, an indication of the uplink resource to use in transmitting, by the UE, the predicted channel report can be transmitted. In an aspect, control configuring component 452, e.g., in conjunction with processor(s) 412, memory 416, transceiver 402, BS communicating component 442, etc., can transmit the indication of the uplink resource to use in transmitting, by the UE, the predicted channel report. For example, control configuring component 452 can transmit the indication in MAC-CE or DCI signaling as a down-selection of the multiple uplink resources configured via RRC signaling, as described above. In receiving the indication or configuration at Block 510, optionally at Block 612, an indication of the uplink resource to use in transmitting the predicted channel report can be received. In an aspect, control processing component 352, e.g., in conjunction with processor(s) 312, memory 316, transceiver 302, UE communicating component 342, etc., can receive the indication of the uplink resource to use in transmitting the predicted channel report.

In some examples, in transmitting the predicted channel report at Block 504, optionally, at Block 520, multiple predicted channel reports can be transmitted for a subset of the multiple resources before receiving downlink communications or transmitting uplink communications over the multiple resources. In an aspect, predicted channel report component 354, e.g., in conjunction with processor(s) 312, memory 316, transceiver 302, UE communicating component 342, etc., can transmit the multiple predicted channel reports for the subset of the multiple resources before receiving downlink communications or transmitting uplink communications over the multiple resources. In one example, this may include transmitting bundled predicted channel reports over bundled resources, as described above. Similarly, in some examples, in receiving the predicted channel report at Block 704, optionally, at Block 720, multiple predicted channel reports can be received for a subset of the multiple resources before transmitting downlink communications or receiving uplink communications over the multiple resources. In an aspect, channel information component 454, e.g., in conjunction with processor(s) 412, memory 416, transceiver 402, BS communicating component 442, etc., can receive the multiple predicted channel reports for the subset of the multiple resources before transmitting downlink communications or receiving uplink communications over the multiple resources.

In this regard, for example, the predicted channel reporting can include one report per configured resource or one report for multiple configured resource in various examples described above and herein. In an example, a predicted channel report can include different MCSs/CQIs, or different MCS with the same CQI, for different PDSCHs (e.g., MCS1/CQI1, MCS2/CQI1, MCS3/CQI1 at respective times t1, t2, t3). In another example, a predicted channel report can include delta MCS/CQI for the different PDSCHs from initial MCS. In another example, a predicted channel report can include an indication (e.g., a flag or other explicit indication, a CQI value that implies the indication, etc.) that all PDSCHs within a SPS occasion use the same MCS, which can be useful for example if coherence time (e.g., the time over which the channel can be considered constant) estimated by the UE is larger than a threshold. For example, the threshold can correspond to Tscheduled, which can be the time taken to transmit multiple PDSCHs configured for the UE. For example, if the UE predicts no channel variations within a scheduling occasion containing multiple PDSCHs (e.g., channel coherence time>=Tscheduled), the UE may report the same MCS/CQI for those PDSCHs. In this example, the UE 104 may not expect that any MCS variation is useful. In another example, the predicted channel report can indicate a bundling of a group of PDSCHs with single CQI/MCS (e.g., a first group of PDSCHs may have a first CQI/MCS and a second group of PDSCHs may have a second CQI/MCS that can be different from the first CQI/MCS, etc.) Additionally, or alternatively, the predicted channel report can indicate interference power, covariance matrix, or eigenvalues prediction, channel prediction, rank, PMI, etc.

In addition, for example, in transmitting the indication or configuration at Block 710, optionally at Block 814, a CSI reporting configuration indicating one or more parameters for predicted channel reporting can be transmitted. In an aspect, control configuring component 452, e.g., in conjunction with processor(s) 412, memory 416, transceiver 402, BS communicating component 442, etc., can transmit the CSI configuration (e.g., as defined in 5G NR), which can indicate one or more parameters for predicted channel reporting. For example, control configuring component 452 can transmit the CSI configuration that configures regular (e.g., non-predicted) CSI reporting to also indicate the one or more parameters for predicted channel reporting. In an example, parameters signaled via RRC signaling described above can be indicated via CSI report configuration from the network node. Such parameters may include one or more of an indication of whether predicted channel reporting is enabled or disabled for the UE, uplink resources used in each predicted channel report (e.g., initial resources or deferred resources where collision occurs, as described above), a change in report of each quantity (e.g., after deferral of transmitting the predicted channel report), a change in report contents (e.g., after deferral of transmitting the predicted channel report), etc. In receiving the indication or configuration at Block 510, optionally at Block 614, a CSI reporting configuration indicating one or more parameters for predicted channel reporting can be received. In an aspect, control processing component 352, e.g., in conjunction with processor(s) 312, memory 316, transceiver 302, UE communicating component 342, etc., can receive the CSI reporting configuration indicating the one or more parameters for predicted channel reporting. In this example, control processing component 352 can process the CSI reporting configuration, determine the parameters related to predicted channel reporting, and perform predicted channel reporting based on the values of the parameters and in accordance with aspects described above.

In one example, the CSI reporting configuration can indicate, for each scheduling collision for the predicted channel reporting (e.g., each indicated uplink resource that collides with a downlink symbol in a TDD pattern), uplink resources for the UE to use in transmitting the predicted channel report after the collision, or can indicate modified values to use in reporting (e.g., modified quantization or compression level, modified number of RSRP values to report, etc.). Control processing component 352 can accordingly process the CSI reporting configuration and use the values to modify predicted channel reporting when collision occurs.

Figure 10:
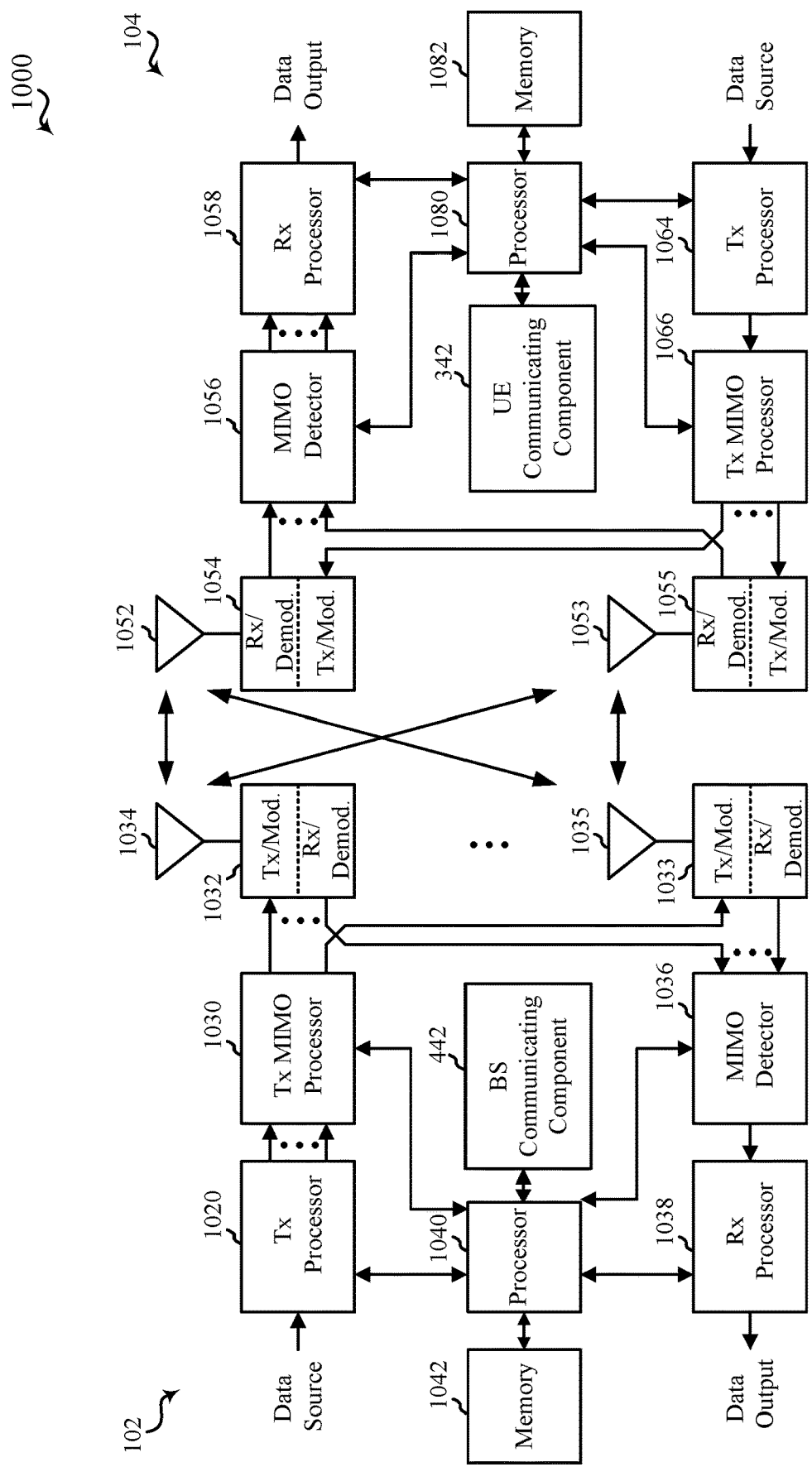
FIG. 10 is a block diagram illustrating an example of a multiple-input multiple-output (MIMO) communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1 and 3. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a UE communicating component 342 (see e.g., FIGS. 1 and 3).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for single carrier-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication including receiving, from a network node, control information related to scheduling multiple resources for wireless communications, including one of SPS for multiple downlink resources for receiving downlink communications or CG scheduling for multiple uplink resources for transmitting uplink communications, and transmitting, for a resource of the multiple resources, in an uplink resource, and based on receiving the control information, a predicted channel report indicating predicted channel measurements for the resource before receiving a downlink communication or transmitting an uplink communication over the resource.

In Aspect 2, the method of Aspect 1 includes where the control information includes downlink control information to activate the resource for receiving the downlink communication or transmitting the uplink communication.

In Aspect 3, the method of any of Aspects 1 or 2 includes where the multiple resources correspond to the multiple downlink resources, and where the predicted channel report includes a predicted CSI report.

In Aspect 4, the method of any of Aspects 1 to 3 includes where the multiple resources correspond to the multiple uplink resources, and where the predicted channel report includes a TPMI or a SRI.

In Aspect 5, the method of any of Aspects 1 to 4 includes where the uplink resource is for transmitting HARQ feedback, and where transmitting the predicted channel report includes multiplexing the predicted channel report with HARQ feedback for a previous downlink communication received over a previous downlink resource of the multiple downlink resources.

In Aspect 6, the method of any of Aspects 1 to 5 includes transmitting, after receiving the downlink communication or transmitting the uplink communication, and before a next resource in the multiple resources, a second predicted channel report for the next resource.

In Aspect 7, the method of Aspect 6 includes where transmitting the predicted channel report is in a first time period corresponding to a time period of a previous resource of the multiple resources plus a periodicity, and where transmitting the second predicted channel report is in a second time period corresponding to the time period of the previous resource plus a multiple of the periodicity.

In Aspect 8, the method of any of Aspects 6 or 7 includes where transmitting the predicted channel report is in a first time period corresponding to a time period of a previous resource of the multiple resources plus an offset and an index of the resource within the multiple resources multiplied by a periodicity, and where transmitting the second predicted channel report is in a second time period corresponding to the time period of the previous resource plus the offset and an index of the second resource within the multiple resources multiplied by the periodicity.

In Aspect 9, the method of Aspect 8, includes receiving, from the network node, a configuration, in RRC configuration, MAC-CE, or DCI, indicating at least one of the offset or the index.

In Aspect 10, the method of any of Aspects 1 to 9 includes where transmitting the predicted channel report is based on a ranking of the predicted channel report among multiple predicted channel reports.

In Aspect 11, the method of Aspect 10 includes where transmitting the predicted channel report based on the ranking includes selecting a quantization or compression level for the predicted channel report based on the ranking.

In Aspect 12, the method of any of Aspects 10 or 11 includes where the ranking corresponds to an index of the predicted channel report within the multiple predicted channel reports.

In Aspect 13, the method of any of Aspects 1 to 12 includes where transmitting the predicted channel report includes transmitting, based on detecting a collision at a previous uplink resource for transmitting the predicted channel report, at least a portion of the predicted channel report in a next available uplink resource based on whether the predicted channel report is expired at a time associated with the next available uplink resource.

In Aspect 14, the method of Aspect 13 includes where transmitting at least the portion of the predicted channel report includes transmitting a channel quality information (CQI) portion of the predicted channel report in the next available uplink resource where the predicted channel report is expired at the time associated with the next available uplink resource.

In Aspect 15, the method of any of Aspects 13 or 14 includes where transmitting at least the portion of the predicted channel report includes transmitting a less number of reported signal measurements than the predicted channel report in the next available uplink resource where the predicted channel report is expired at the time associated with the next available uplink resource.

In Aspect 16, the method of any of Aspects 13 to 15 includes measuring, from at least one of a first time corresponding to receiving the control information, a second time corresponding to a configured reference time, a third time corresponding to a time for transmitting the predicted channel report, or a fourth time corresponding to a signal from which the predicted channel is predicted, an expiration timer for determining whether the predicted channel report is expired.

In Aspect 17, the method of any of Aspects 1 to 16 includes receiving, from the network node in RRC configuration or DCI, an indication of bundled channel reporting resources including the uplink resource for transmitting multiple predicted channel reports including the predicted channel report.

In Aspect 18, the method of Aspect 17 includes where the indication indicates a bundle of channel reporting resources in a sequence of multiple bundled channel reporting resources to use for transmitting the predicted channel report.

In Aspect 19, the method of Aspect 18 includes receiving, from the network node in RRC configuration, MAC-CE, or DCI, an indication of resources in each bundle of channel reporting resources in the multiple bundled channel reporting resources.

In Aspect 20, the method of any of Aspects 1 to 19 includes receiving, from the network node in RRC configuration, MAC-CE, or DCI, an indication of a bundle size of uplink resources for transmitting predicted channel reports and a bitmap indicating the uplink resource in the uplink resources to use for transmitting the predicted channel report.

In Aspect 21, the method of any of Aspects 1 to 20 includes receiving, from the network node, a configuration for communicating using multiple CCs with multiple cells, where transmitting the predicted channel report includes transmitting the predicted channel report in a CC of the multiple CCs corresponding to a PCell of the multiple cells.

In Aspect 22, the method of any of Aspects 1 to 21 includes receiving, from the network node, a configuration for communicating using multiple CCs with multiple cells, where transmitting the predicted channel report includes transmitting the predicted channel report in a fastest CC of the multiple CCs.

In Aspect 23, the method of Aspect 22 includes receiving, from the network node in RRC configuration, MAC-CE, or DCI, a ranking of the multiple CCs, where the fastest CC is determined is a highest ranked CC in the ranking of the multiple CCs.

In Aspect 24, the method of any of Aspects 1 to 23 includes where transmitting the predicted channel report includes transmitting the predicted channel report in RRC UAI, MAC-CE, or UCI.

In Aspect 25, the method of any of Aspects 1 to 24 includes where transmitting the predicted channel report includes transmitting the predicted channel report along with one or more of a periodic or aperiodic or semi-persistent CSI report, a HARQ ACK, a BSR, a SR, a PHR, a PUSCH allocation, a RACH message, or a WUS.

In Aspect 26, the method of any of Aspects 1 to 25 includes receiving, from the network node in RRC configuration or MAC-CE, an indication of multiple uplink resources for transmitting predicted channel reports, and receiving, from the network node in DCI, an indication of the uplink resource, from the multiple uplink resources, to use in transmitting the predicted channel report.

In Aspect 27, the method of any of Aspects 1 to 26 includes where transmitting the predicted channel report includes transmitting, in the uplink resource, multiple predicted channel reports for a subset of the multiple resources before receiving downlink communications or transmitting uplink communications over the multiple resources.

In Aspect 28, the method of Aspect 27 includes where transmitting the multiple predicted channel reports includes transmitting a bitmap indicating for which of the multiple resources the multiple predicted channel reports correspond.

In Aspect 29, the method of any of Aspects 27 or 28 includes receiving, from the network node, an indication of the subset of multiple resources for which to transmit predicted channel reports.

In Aspect 30, the method of Aspect 29 includes where receiving the indication includes receiving the indication in dynamic or semi-static signaling.

In Aspect 31, the method of any of Aspects 29 or 30 includes where the indication is periodic, aperiodic, or semi-persistent.

In Aspect 32, the method of any of Aspects 27 to 31 includes receiving, from the network node in RRC configuration or MAC-CE, an indication to enable transmitting multiple predicted channel reports.

In Aspect 33, the method of Aspect 32 includes receiving, in MAC-CE or DCI, an update to one or more of the multiple uplink resources or the indication of the uplink resource.

In Aspect 34, the method of any of Aspects 1 to 33 includes transmitting, after receiving the downlink communication and before a next resource in the multiple resources, a second predicted channel report for the next resource, where the predicted channel report includes a first MCS or CQI and the second predicted channel report includes a second MCS or CQI.

In Aspect 35, the method of any of Aspects 1 to 34 includes transmitting, after receiving the downlink communication and before a next resource in the multiple resources, a second predicted channel report for the next resource, where the predicted channel report includes a first MCS or CQI and the second predicted channel report includes delta between the first MCS or CQI and a second MCS or CQI.

In Aspect 36, the method of any of Aspects 1 to 35 includes where the predicted channel report includes a flag indicating that channel prediction in the predicted channel report is used for the multiple downlink resources.

In Aspect 37, the method of any of Aspects 1 to 36 includes where the predicted channel report indicates that channel prediction in the predicted channel report is used for a group of resources of the multiple resources.

In Aspect 38, the method of any of Aspects 1 to 37 includes where the predicted channel report includes one or more of an interference power or covariance matrix or eigenvalues prediction, a channel prediction, a rank, or a PMI.

In Aspect 39, the method of any of Aspects 1 to 38 includes receiving, from the network node, a CSI reporting configuration indicating to enable or disable predicted channel reporting.

In Aspect 40, the method of any of Aspects 1 to 39 includes receiving, from the network node, a CSI reporting configuration indicating, for each scheduling collision for the predicted channel reporting, uplink resources to use in reporting predicted channel after the collision, or modifications of values to use in reporting predicted channel after the collision.

In Aspect 41, the method of any of Aspects 1 to 40 includes transmitting, after transmitting the uplink communication and before a next resource in the multiple resources, a second predicted channel report for the next resource, where the predicted channel report includes a first TPMI or SRI and the second predicted channel report includes a second TPMI or SRI.

In Aspect 42, the method of any of Aspects 1 to 41 includes transmitting, after transmitting the uplink communication and before a next resource in the multiple resources, a second predicted channel report for the next resource, where the predicted channel report includes a first TPMI or SRI and the second predicted channel report includes delta between the first TPMI or SRI and a second TPMI or SRI.

In Aspect 43, the method of any of Aspects 1 to 42 includes receiving, from the network node and based on transmitting the predicted channel report, an adjusted value for one or more parameters for receiving downlink communications or transmitting uplink communications over the resource.

Aspect 44 is a method for wireless communication including transmitting, for a user equipment (UE), control information related to scheduling multiple resources for wireless communications, including one of SPS for multiple downlink resources for transmitting, to the UE, downlink communications or CG scheduling for multiple uplink resources for receiving, from the UE, uplink communications, and receiving, for a resource of the multiple resources, in an uplink resource, a predicted channel report indicating predicted channel measurements for the resource transmitting a downlink communication or receiving an uplink communication over the resource.

In Aspect 45, the method of Aspect 44 includes where the control information includes downlink control information to activate the resource for receiving the downlink communication or transmitting the uplink communication.

In Aspect 46, the method of any of Aspects 44 or 45 includes where the multiple resources correspond to the multiple downlink resources, and where the predicted channel report includes a predicted CSI report.

In Aspect 47, the method of any of Aspects 44 to 46 includes where the multiple resources correspond to the multiple uplink resources, and where the predicted channel report includes a TPMI or a SRI.

In Aspect 48, the method of any of Aspects 44 to 47 includes where the uplink resource is for transmitting HARQ feedback, and where receiving the predicted channel report includes receiving the predicted channel report multiplexed with HARQ feedback for a previous downlink communication transmitted, to the UE, over a previous downlink resource of the multiple downlink resources.

In Aspect 49, the method of Aspect 48 includes receiving, after transmitting the downlink communication or receiving the uplink communication, and before a next resource in the multiple resources, a second predicted channel report for the next resource.

In Aspect 50, the method of Aspect 49 includes where receiving the predicted channel report is in a first time period corresponding to a time period of a previous resource of the multiple resources plus a periodicity, and where receiving the second predicted channel report is in a second time period corresponding to the time period of the previous resource plus a multiple of the periodicity.

In Aspect 51, the method of any of Aspects 49 or 50 includes where receiving the predicted channel report is in a first time period corresponding to a time period of a previous resource of the multiple resources plus an offset and an index of the resource within the multiple resources multiplied by a periodicity, and where receiving the second predicted channel report is in a second time period corresponding to the time period of the previous resource plus the offset and an index of the second resource within the multiple resources multiplied by the periodicity.

In Aspect 52, the method of Aspect 51 includes transmitting, for the UE, a configuration, in RRC configuration, MAC-CE, or DCI, indicating at least one of the offset or the index.

In Aspect 53, the method of any of Aspects 44 to 52 includes where receiving the predicted channel report is based on a ranking of the predicted channel report among multiple predicted channel reports.

In Aspect 54, the method of Aspect 53 includes where receiving the predicted channel report based on the ranking includes selecting a quantization or compression level for the predicted channel report based on the ranking.

In Aspect 55, the method of any of Aspects 53 or 54 includes where the ranking corresponds to an index of the predicted channel report within the multiple predicted channel reports.

In Aspect 56, the method of any of Aspects 44 to 55 includes where receiving the predicted channel report includes receiving, based on a collision at a previous uplink resource for the predicted channel report, at least a portion of the predicted channel report in a next available uplink resource based on whether the predicted channel report is expired at a time associated with the next available uplink resource.

In Aspect 57, the method of Aspect 56 includes where receiving at least the portion of the predicted channel report includes receiving a CQI portion of the predicted channel report in the next available uplink resource where the predicted channel report is expired at the time associated with the next available uplink resource.

In Aspect 58, the method of any of Aspects 56 or 57 includes where receiving at least the portion of the predicted channel report includes receiving a less number of reported signal measurements than the predicted channel report in the next available uplink resource where the predicted channel report is expired at the time associated with the next available uplink resource.

In Aspect 59, the method of any of Aspects 44 to 58 includes transmitting, for the UE, in RRC configuration or DCI, an indication of bundled channel reporting resources including the uplink resource for transmitting multiple predicted channel reports including the predicted channel report.

In Aspect 60, the method of Aspect 59 includes where the indication indicates a bundle of channel reporting resources in a sequence of multiple bundled channel reporting resources to use for transmitting the predicted channel report.

In Aspect 61, the method of Aspect 60 includes transmitting, for the UE, in RRC configuration, MAC-CE, or DCI, an indication of resources in each bundle of channel reporting resources in the multiple bundled channel reporting resources.

In Aspect 62, the method of any of Aspects 44 to 61 includes transmitting, for the UE, in RRC configuration, MAC-CE, or DCI, an indication of a bundle size of uplink resources for transmitting predicted channel reports and a bitmap indicating the uplink resource in the uplink resources to use for transmitting the predicted channel report.

In Aspect 63, the method of any of Aspects 44 to 62 includes transmitting, for the UE, a configuration for communicating using multiple CCs with multiple cells, where receiving the predicted channel report includes receiving the predicted channel report in a CC of the multiple CCs corresponding to a PCell of the multiple cells.

In Aspect 64, the method of any of Aspects 44 to 63 includes transmitting, for the UE, a configuration for communicating using multiple CCs with multiple cells, where receiving the predicted channel report includes receiving the predicted channel report in a fastest CC of the multiple CCs.

In Aspect 65, the method of Aspect 64 includes transmitting, for the UE, in RRC configuration, MAC-CE, or DCI, a ranking of the multiple CCs, where the fastest CC is determined is a highest ranked CC in the ranking of the multiple CCs.

In Aspect 66, the method of any of Aspects 44 to 65 includes where receiving the predicted channel report includes receiving the predicted channel report in RRC UAI, MAC-CE, or UCI.

In Aspect 67, the method of any of Aspects 44 to 66 includes where receiving the predicted channel report includes receiving the predicted channel report along with one or more of a periodic or aperiodic or semi-persistent CSI report, a HARQ ACK, a BSR, a SR, a PHR, a PUSCH allocation, a RACH message, or a WUS.

In Aspect 68, the method of any of Aspects 44 to 67 includes transmitting, for the UE, in RRC configuration or MAC-CE, an indication of multiple uplink resources for transmitting predicted channel reports, and transmitting, for the UE, in DCI, an indication of the uplink resource, from the multiple uplink resources, to use in transmitting the predicted channel report.

In Aspect 69, the method of any of Aspects 44 to 68 includes where receiving the predicted channel report includes receiving, in the uplink resource, multiple predicted channel reports for a subset of the multiple resources before transmitting downlink communications or receiving uplink communications over the multiple resources.

In Aspect 70, the method of Aspect 69 includes where receiving the multiple predicted channel reports includes receiving a bitmap indicating for which of the multiple resources the multiple predicted channel reports correspond.

In Aspect 71, the method of any of Aspects 69 or 70 includes transmitting, for the UE, an indication of the subset of multiple resources for which to transmit predicted channel reports.

In Aspect 72, the method of Aspect 71 includes where transmitting the indication includes transmitting the indication in dynamic or semi-static signaling.

In Aspect 73, the method of Aspect 72 includes where the indication is periodic, aperiodic, or semi-persistent.

In Aspect 74, the method of any of Aspects 69 to 73 includes transmitting, for the UE, in RRC configuration or MAC-CE, an indication to enable transmitting multiple predicted channel reports.

In Aspect 75, the method of Aspect 74 includes transmitting, in MAC-CE or DCI, an update to one or more of the multiple uplink resources or the indication of the uplink resource.

In Aspect 76, the method of any of Aspects 44 to 75 includes receiving, after transmitting the downlink communication and before a next resource in the multiple resources, a second predicted channel report for the next resource, where the predicted channel report includes a first MCS or CQI and the second predicted channel report includes a second MCS or CQI.

In Aspect 77, the method of any of Aspects 44 to 76 includes receiving, after transmitting the downlink communication and before a next resource in the multiple resources, a second predicted channel report for the next resource, where the predicted channel report includes a first MCS or CQI and the second predicted channel report includes delta between the first MCS or CQI and a second MCS or CQI.

In Aspect 78, the method of any of Aspects 44 to 77 includes where the predicted channel report includes a flag indicating that channel prediction in the predicted channel report is used for the multiple downlink resources.

In Aspect 79, the method of any of Aspects 44 to 78 includes where the predicted channel report indicates that channel prediction in the predicted channel report is used for a group of resources of the multiple resources.

In Aspect 80, the method of any of Aspects 44 to 79 includes where the predicted channel report includes one or more of an interference power or covariance matrix or eigenvalues prediction, a channel prediction, a rank, or a precoding matrix indicator (PMI).

In Aspect 81, the method of any of Aspects 44 to 80 includes transmitting, for the UE, a CSI reporting configuration indicating to enable or disable predicted channel reporting.

In Aspect 82, the method of any of Aspects 44 to 81 includes transmitting, for the UE, a CSI reporting configuration indicating, for each scheduling collision for the predicted channel reporting, uplink resources to use in reporting predicted channel after the collision, or modifications of values to use in reporting predicted channel after the collision.

In Aspect 83, the method of any of Aspects 44 to 82 includes receiving, after receiving the uplink communication and before a next resource in the multiple resources, a second predicted channel report for the next resource, where the predicted channel report includes a first TPMI or SRI and the second predicted channel report includes a second TPMI or SRI.

In Aspect 84, the method of any of Aspects 44 to 83 includes receiving, after receiving the uplink communication and before a next resource in the multiple resources, a second predicted channel report for the next resource, where the predicted channel report includes a first TPMI or SRI and the second predicted channel report includes delta between the first TPMI or SRI and a second TPMI or SRI.

In Aspect 85, the method of any of Aspects 44 to 84 includes transmitting, for the UE and based on receiving the predicted channel report, an adjusted value for one or more parameters for transmitting, to the UE, downlink communications or receiving, from the UE, uplink communications over the resource.

Aspect 85 is an apparatus for wireless communication including a processor, memory coupled with the processor, and instructions stored in the memory and operable, when executed by the processor, to cause the apparatus to perform any of the methods of Aspects 1 to 84.

Aspect 86 is an apparatus for wireless communication including means for performing any of the methods of Aspects 1 to 84.

Aspect 87 is a computer-readable medium including code executable by one or more processors for wireless communications, the code including code for performing any of the methods of Aspects 1 to 84.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;
transmit, for a resource of the multiple resources, in an uplink resource, and based on receiving the control information, a predicted channel report indicating predicted channel measurements for the resource before receiving a downlink communication or transmitting an uplink communication over the resource; and
receive, from the network node in radio resource control (RRC) configuration, media access control-control element (MAC-CE), or downlink control information (DCI), an indication of a bundle size of uplink resources for transmitting predicted channel reports and a bitmap indicating the uplink resource in the uplink resources to use for transmitting the predicted channel report.

2. The apparatus of claim 1, wherein the control information includes downlink control information to activate the resource for receiving the downlink communication or transmitting the uplink communication.

3. The apparatus of claim 1, wherein the multiple resources correspond to the multiple downlink resources, and wherein the predicted channel report includes a predicted channel state information (CSI) report.

4. The apparatus of claim 1, wherein the multiple resources correspond to the multiple uplink resources, and wherein the predicted channel report includes a transmitting precoding matrix indicator (TPMI) or a scheduling request indicator (SRI).

5. The apparatus of claim 1, wherein the uplink resource is for transmitting hybrid automatic repeat/request (HARQ) feedback, and wherein the one or more processors are configured to execute the instructions to cause the apparatus to transmit the predicted channel report at least in part by multiplexing the predicted channel report with HARQ feedback for a previous downlink communication received over a previous downlink resource of the multiple downlink resources.

6. The apparatus of claim 1, wherein the one or more processors are configured to execute the instructions to cause the apparatus to transmit, after receiving the downlink communication or transmitting the uplink communication, and before a next resource in the multiple resources, a second predicted channel report for the next resource.

7. The apparatus of claim 1, wherein the one or more processors are configured to execute the instructions to cause the apparatus to transmit the predicted channel report based on a ranking of the predicted channel report among multiple predicted channel reports.

8. The apparatus of claim 1, wherein the one or more processors are configured to execute the instructions to cause the apparatus to receive, from the network node in radio resource control (RRC) configuration or downlink control information (DCI), an indication of bundled channel reporting resources including the uplink resource for transmitting multiple predicted channel reports including the predicted channel report.

9. The apparatus of claim 1, wherein the one or more processors are configured to execute the instructions to cause the apparatus to receive, from the network node, a configuration for communicating using multiple component carriers (CCs) with multiple cells, wherein the one or more processors are configured to execute the instructions to cause the apparatus to transmit the predicted channel report in a CC of the multiple CCs corresponding to a primary cell (PCell) of the multiple cells.

10. The apparatus of claim 1, wherein the one or more processors are configured to execute the instructions to cause the apparatus to transmit the predicted channel report in radio resource control (RRC) user assistance information (UAI), media access control-control element (MAC-CE), or uplink control information (UCI).

11. The apparatus of claim 1, wherein the one or more processors are configured to execute the instructions to cause the apparatus to transmit the predicted channel report along with one or more of a periodic or aperiodic or semi-persistent CSI report, a hybrid automatic repeat/request (HARQ) acknowledgement (ACK), a buffer status report (BSR), a scheduling request (SR), a power headroom report (PHR), a physical uplink shared channel (PUSCH) allocation, a random access channel (RACH) message, or a wake-up signal (WUS).

12. The apparatus of claim 1, wherein the one or more processors are configured to execute the instructions to cause the apparatus to:

receive, from the network node in radio resource control (RRC) configuration or media access control-control element (MAC-CE), an indication of multiple uplink resources for transmitting predicted channel reports; and receive, from the network node in downlink control information (DCI), an indication of the uplink resource, from the multiple uplink resources, to use in transmitting the predicted channel report.

13. The apparatus of claim 1, wherein the one or more processors are configured to execute the instructions to cause the apparatus to transmit the predicted channel report at least in part by transmitting, in the uplink resource, multiple predicted channel reports for a subset of the multiple resources before receiving downlink communications or transmitting uplink communications over the multiple resources.

14. The apparatus of claim 1, wherein the one or more processors are configured to execute the instructions to cause the apparatus to transmit, after receiving the downlink communication and before a next resource in the multiple resources, a second predicted channel report for the next resource, wherein the predicted channel report includes a first modulation and coding scheme (MCS) or channel quality indicator (CQI) and the second predicted channel report includes a second MCS or CQI.

15. The apparatus of claim 1, wherein the one or more processors are configured to execute the instructions to cause the apparatus to transmit, after receiving the downlink communication and before a next resource in the multiple resources, a second predicted channel report for the next resource, wherein the predicted channel report includes a first modulation and coding scheme (MCS) or channel quality indicator (CQI) and the second predicted channel report includes delta between the first MCS or CQI and a second MCS or CQI.

16. The apparatus of claim 1, wherein the predicted channel report includes a flag indicating that channel prediction in the predicted channel report is used for the multiple downlink resources.

17. The apparatus of claim 1, wherein the predicted channel report indicates that channel prediction in the predicted channel report is used for a group of resources of the multiple resources.

18. The apparatus of claim 1, wherein the predicted channel report includes one or more of an interference power or covariance matrix or eigenvalues prediction, a channel prediction, a rank, or a precoding matrix indicator (PMI).

19. The apparatus of claim 1, wherein the one or more processors are configured to execute the instructions to cause the apparatus to receive, from the network node, a CSI reporting configuration indicating to enable or disable predicted channel reporting.

20. The apparatus of claim 1, wherein the one or more processors are configured to execute the instructions to cause the apparatus to receive, from the network node, a CSI reporting configuration indicating, for each scheduling collision for the predicted channel report, uplink resources to use in reporting predicted channel after the collision, or modifications of values to use in reporting predicted channel after the collision.

21. The apparatus of claim 1, wherein the one or more processors are configured to execute the instructions to cause the apparatus to transmit, after transmitting the uplink communication and before a next resource in the multiple resources, a second predicted channel report for the next resource, wherein the predicted channel report includes a first transmitting matrix precoding indicator (TPMI) or scheduling request indicator (SRI) and the second predicted channel report includes a second TPMI or SRI.

22. An apparatus for wireless communication, comprising:
  a transceiver;
  a memory configured to store instructions; and
  one or more processors communicatively coupled with the memory and the transceiver, wherein the one or more processors are configured to execute the instructions to cause the apparatus to:
    receive, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;
    transmit, for a resource of the multiple resources, in an uplink resource, and based on receiving the control information, a predicted channel report indicating predicted channel measurements for the resource before receiving a downlink communication or transmitting an uplink communication over the resource; and
    transmit the predicted channel report at least in part by transmitting, based on detecting a collision at a previous uplink resource for transmitting the predicted channel report, at least a portion of the predicted channel report in a next available uplink resource based on whether the predicted channel report is expired at a time associated with the next available uplink resource.

23. An apparatus for wireless communication, comprising:
  a transceiver;
  a memory configured to store instructions; and
  one or more processors communicatively coupled with the memory and the transceiver, wherein the one or more processors are configured to execute the instructions to cause the apparatus to:
    receive, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;
    transmit, for a resource of the multiple resources, in an uplink resource, and based on receiving the control information, a predicted channel report indicating predicted channel measurements for the resource before receiving a downlink communication or transmitting an uplink communication over the resource; and
    receive, from the network node, a configuration for communicating using multiple component carriers (CCs) with multiple cells, wherein the one or more processors are configured to execute the instructions to cause the apparatus to transmit the predicted channel report in a fastest CC of the multiple CCs.

24. An apparatus for wireless communication, comprising:
  a transceiver;
  a memory configured to store instructions; and
  one or more processors communicatively coupled with the memory and the transceiver, wherein the one or more processors are configured to execute the instructions to cause the apparatus to:
    transmit, for a user equipment (UE), control information related to scheduling multiple resources for wireless communications, including one of semi-persistent scheduling (SPS) for multiple downlink resources for transmitting, to the UE, downlink communications or configured grant (CG) scheduling for multiple uplink resources for receiving, from the UE, uplink communications; and
    receive, for a resource of the multiple resources, in an uplink resource, a predicted channel report indicating predicted channel measurements for the resource transmitting a downlink communication or receiving an uplink communication over the resource; and
    transmit, for the UE in radio resource control (RRC) configuration, media access control-control element (MAC-CE), or downlink control information (DCI), an indication of a bundle size of uplink resources for receiving predicted channel reports and a bitmap indicating the uplink resource in the uplink resources to use for receiving the predicted channel report.

25. The apparatus of claim 24, wherein the control information includes downlink control information to activate the resource for receiving the downlink communication or transmitting the uplink communication.

26. A method for wireless communication, comprising:
  receiving, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;
  transmitting, for a resource of the multiple resources, in an uplink resource, and based on receiving the control information, a predicted channel report indicating predicted channel measurements for the resource before receiving a downlink communication or transmitting an uplink communication over the resource; and
  receiving, from the network node in radio resource control (RRC) configuration, media access control-control element (MAC-CE), or downlink control information (DCI), an indication of a bundle size of uplink resources for transmitting predicted channel reports and a bitmap indicating the uplink resource in the uplink resources to use for transmitting the predicted channel report.

27. The method of claim 26, wherein the control information includes downlink control information to activate the resource for receiving the downlink communication or transmitting the uplink communication.

28. A method for wireless communication, comprising:
  transmitting, for a user equipment (UE), control information related to scheduling multiple resources for wireless communications, including one of semi-persistent scheduling (SPS) for multiple downlink resources for transmitting, to the UE, downlink communications or configured grant (CG) scheduling for multiple uplink resources for receiving, from the UE, uplink communications;
  receiving, for a resource of the multiple resources, in an uplink resource, a predicted channel report indicating predicted channel measurements for the resource transmitting a downlink communication or receiving an uplink communication over the resource; and transmitting, for the UE in radio resource control (RRC) configuration, media access control-control element (MAC-CE), or downlink control information (DCI), an indication of a bundle size of uplink resources for receiving predicted channel reports and a bitmap indicating the uplink resource in the uplink resources to use for receiving the predicted channel report.

29. The method of claim 28, wherein the control information includes downlink control information to activate the resource for receiving the downlink communication or transmitting the uplink communication.

30. A method for wireless communication, comprising:

receiving, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;

transmitting, for a resource of the multiple resources, in an uplink resource, and based on receiving the control information, a predicted channel report indicating predicted channel measurements for the resource before receiving a downlink communication or transmitting an uplink communication over the resource; and transmitting the predicted channel report at least in part by transmitting, based on detecting a collision at a previous uplink resource for transmitting the predicted channel report, at least a portion of the predicted channel report in a next available uplink resource based on whether the predicted channel report is expired at a time associated with the next available uplink resource.

31. A method for wireless communication, comprising:

receiving, from a network node, control information related to scheduling multiple resources for wireless communications, including one of semi-persistent scheduling (SPS) for multiple downlink resources for receiving downlink communications or configured grant (CG) scheduling for multiple uplink resources for transmitting uplink communications;

transmitting, for a resource of the multiple resources, in an uplink resource, and based on receiving the control information, a predicted channel report indicating predicted channel measurements for the resource before receiving a downlink communication or transmitting an uplink communication over the resource; and receiving, from the network node, a configuration for communicating using multiple component carriers (CCs) with multiple cells, wherein the one or more processors are configured to execute the instructions to cause the apparatus to transmit the predicted channel report in a fastest CC of the multiple CCs.

* * * * *